United States Patent
Ahn et al.

(10) Patent No.: US 11,764,896 B2
(45) Date of Patent: *Sep. 19, 2023

(54) AGGREGATED-MPDU, METHOD FOR TRANSMITTING RESPONSE FRAME THERETO, AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Woojin Ahn, Gyeonggi-do (KR); Juhyung Son, Gyeonggi-do (KR); Geonjung Ko, Gyeonggi-do (KR); Jinsam Kwak, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

(*) Notice: Subject to any disclaimer, the term of this patent is extended or adjusted under 35 U.S.C. 154(b) by 14 days.

This patent is subject to a terminal disclaimer.

(21) Appl. No.: 17/157,996

(22) Filed: Jan. 25, 2021

(65) Prior Publication Data
US 2021/0152276 A1   May 20, 2021

Related U.S. Application Data

(63) Continuation of application No. 16/449,132, filed on Jun. 21, 2019, now Pat. No. 10,931,396, which is a
(Continued)

(30) Foreign Application Priority Data

Dec. 21, 2016 (KR) .................. 10-2016-0175999
Apr. 13, 2017 (KR) .................. 10-2017-0048145
Nov. 4, 2017 (KR) .................. 10-2017-0146357

(51) Int. Cl.
*H04W 80/02* (2009.01)
*H04L 1/00* (2006.01)
(Continued)

(52) U.S. Cl.
CPC .......... *H04L 1/0008* (2013.01); *H04L 1/1614* (2013.01); *H04L 1/1621* (2013.01);
(Continued)

(58) Field of Classification Search
CPC .. H04L 12/28; H04W 72/0406; H04W 56/00; H04W 74/0833; H04W 24/10
(Continued)

(56) References Cited

U.S. PATENT DOCUMENTS 9,179,354 B2   11/2015   Rubin et al.
2011/0268094 A1   11/2011   Gong et al.
(Continued)

FOREIGN PATENT DOCUMENTS

CN   103563457   2/2014
CN   104321995   1/2015
(Continued)

OTHER PUBLICATIONS

Office Action dated Jan. 26, 2022 for Chinese Patent Application No. 201780079155.0 and its English translation provided by Applicant's foreign counsel.
(Continued)

*Primary Examiner* — Dang T Ton
(74) *Attorney, Agent, or Firm* — Ladas & Parry, LLP

(57) ABSTRACT

The present invention relates to a method for transmitting an aggregate MPDU and a response frame thereto and a wireless communication terminal using the same, and more particularly, to a wireless communication method and a
(Continued)

wireless communication terminal for setting various formats of the aggregate MPDU and the response frame thereto and performing an efficient data communication by using the same. To this end, provided are a wireless communication terminal including: a processor; and a communication unit, wherein the processor receives an aggregate MPDU (A-MPDU) consisting of one or more MAC protocol data units (MPDUs), determines a format of a response frame for the received A-MPDU, and
transmits a response frame of the determined format, wherein the format of the response frame for the A-MPDU is determined based on at least one of the number of traffic IDs (TIDs) soliciting an immediate response in MPDU(s) successfully received in the A-MPDU and MPDU delimiter information of the A-MPDU and a wireless communication method using the same.

16 Claims, 13 Drawing Sheets

Related U.S. Application Data continuation of application No. PCT/KR2017/015265, filed on Dec. 21, 2017.

(51) Int. Cl.
*H04L 1/1607* (2023.01)
*H04W 72/0446* (2023.01)
*H04W 72/542* (2023.01)

(52) U.S. Cl.
CPC ..... *H04W 72/0446* (2013.01); *H04W 72/542* (2023.01); *H04W 80/02* (2013.01)

(58) Field of Classification Search
USPC ......................................................... 370/329
See application file for complete search history.

(56) References Cited

U.S. PATENT DOCUMENTS

| | | |
|---|---|---|
| 2014/0254552 A1 | 9/2014 | Hayes et al. |
| 2015/0124689 A1 | 5/2015 | Merlin et al. |
| 2015/0124690 A1 | 5/2015 | Merlin et al. |
| 2015/0288501 A1 | 10/2015 | Kwon et al. |
| 2015/0295680 A1 | 10/2015 | Othman et al. |
| 2016/0080115 A1 | 3/2016 | Joshiam et al. |
| 2016/0127020 A1 | 5/2016 | Abraham et al. |
| 2016/0182205 A1 | 6/2016 | Asterjadhi et al. |
| 2016/0183274 A1 | 6/2016 | Trainin et al. |
| 2016/0302229 A1 | 10/2016 | Hedayat |
| 2016/0315681 A1 | 10/2016 | Moon et al. |
| 2016/0360442 A1 | 12/2016 | Stacey et al. |
| 2017/0150493 A1 | 5/2017 | Seok |
| 2017/0257196 A1 | 9/2017 | Ghosh et al. |
| 2017/0272138 A1 | 9/2017 | Chun et al. |
| 2017/0289911 A1 | 10/2017 | Kim et al. |
| 2017/0303280 A1 | 10/2017 | Chun et al. |
| 2017/0310446 A1 | 10/2017 | Asterjadhi et al. |
| 2018/0145801 A1 | 5/2018 | Wang et al. |
| 2018/0254861 A1 | 9/2018 | Cherian et al. |
| 2019/0319738 A1* | 10/2019 | Ahn .................. H04W 72/0446 |
| 2020/0259595 A1 | 8/2020 | Seok et al. |

FOREIGN PATENT DOCUMENTS

| | | |
|---|---|---|
| CN | 105432114 | 3/2016 |
| JP | 2013-536599 | 9/2013 |
| JP | 2016-533675 | 10/2016 |
| KR | 10-2015-0111270 | 10/2015 |
| KR | 10-2016-0039638 | 4/2016 |
| WO | 2011/159831 | 12/2011 |
| WO | 2015/066440 | 5/2015 |
| WO | 2016/007770 | 1/2016 |
| WO | 2016/032258 | 3/2016 |
| WO | 2016/043538 | 3/2016 |
| WO | 2016/068572 | 5/2016 |
| WO | 2016/111435 | 7/2016 |
| WO | 2016/167608 | 10/2016 |
| WO | 2018/117697 | 6/2018 |

OTHER PUBLICATIONS

Office Action dated Feb. 24, 2022 for Korean Patent Application No. 10-2022-7001640 and its English translation provided by Applicant's foreign counsel.
Office Action dated Feb. 19, 2021 for Indian Patent Application No. 201927025421.
Notice of Allowance dated May 10, 2022 for Korean Patent Application No. 10-2022-7001640 and its English translation provided by Applicant's foreign counsel.
Office Action dated May 7, 2022 for Chinese Patent Application No. 201780041848.0 and its English translation provided by Applicant's foreign counsel.
Notice of Allowance dated May 16, 2022 for Japanese Patent Application No. 2020-125358 and its English translation provided by Applicant's foreign counsel.
Notice of Allowance dated May 16, 2022 for Japanese Patent Application No. 2020-125359 and its English translation provided by Applicant's foreign counsel.
Corrected Notice of Allowance dated May 26, 2022 for U.S. Appl. No. 16/935,858.
Notice of Allowance dated Oct. 15, 2021 for Korean Patent Application No. 10-2021-7016873 and its English translation provided by Applicant's foreign counsel.
Office Action dated Apr. 19, 2021 for European Patent Application No. 17 824 568.4.
Notice of Allowance dated Apr. 20, 2021 for U.S. Appl. No. 16/596,674.
Office Action dated Jun. 1, 2021 for European Patent Application No. 17 884 228.2.
Office Action dated Jun. 14, 2021 for Japanese Patent Application No. 2020-125358 and its English translation provided by the Applicant's foreign counsel.
Office Action dated Jun. 14, 2021 for Japanese Patent Application No. 2020-125359 and its English translation provided by the Applicant's foreign counsel.
Kiseon Ryu, "Ack Policy for UL MU Ack transmission", IEEE 802.11-15/1346r1, Internet URL:https://mentor.ieee.org/802.11/dcn/15/11-15-1346-01-00ax-ack-policy-for-ul-mu-ack-transmisssion.ppx, Nov. 8, 2015.
Po-Kai Huang (Intel), Comment Resolution on Trigger Frame Format—MU-RTS Variant, IEEE 802.11-16/0808r0, Internet URL:https://mentor.ieee.org/802.11/dcn/16/11-16-0808-00-00ax-comment-resolution-on-trieegr-frame-format-mu-rts-variant.docs, Jun. 28, 2016.
Office Action dated Jun. 22, 2021 for Korean Patent Application No. 10-2021-7016873 and its English translation provided by the Applicant's foreign counsel.
International Search Report for PCT/KR2017/015265 dated Apr. 10, 2018 and its English translation from WIPO (now published as WO 2018/117697).
Written Opinion of the International Searching Authority for PCT/KR2017/015265 dated Apr. 10, 2018 and its English translation from WIPO (now published as WO 2018/117697).
Robert Stacey et al.: "IEEE P802.11 Wireless LANs Submission doc.: IEEE 802.11-17/16822r0", Comments on TXax/D2.0, Nov. 5, 2017 https://mentor.ieee.org/802.11/dcn/17/11-17-1682-00-00ax-comments-on-tgax-d2-0.xlsx.
Notice of Allowance dated Jun. 18, 2020 for Korean Patent Application No. 10-2020-7002361 and its English machine translation by Global Dossier.

(56) References Cited

OTHER PUBLICATIONS

Notice of Allowance dated Jun. 22, 2020 for Japanese Patent Application No. 2019-500497 and its English translation provided by Applicant's foreign counsel.
Office Action dated Jul. 13, 2020 for Japanese Patent Application No. 2019-533391 and its English translation provided by Applicant's foreign counsel.
Liwen Chu: "IEEE P802.11 Wireless LANs Submission doc.: IEEE 802.11-16_1185r1", Comments on TGax D0.1, Sep. 12, 2016.
George Cherian et al.: "IEEE P802.11 Wireless LANs Submission doc.: IEEE 802.11-16_0024r3", Comments on TGax D0.1, Apr. 17, 2016.
Office Action dated Jul. 28, 2020 for U.S. Appl. No. 16/596,674.
Extended European Search Report dated Aug. 5, 2020 for European Patent Application No. 17884228.2.
Liwen Chu et al.: "Multi TID A-MPDU in MU Transmission". Jan. 18, 2016, doc: 801.11-16/0069r0, XP068104841.
Alfred Asterjadhi et al.: "Block Ack generation and selection rules". May 14, 2016, doc: IPEEE 802.11-16/0616r2; XP068119447.
IPEE P802.11ax™/D1.0 "Draft Standard for Information Technology-Telecommunications and information exchange between systems Local and metropolitan area networks—Specific requirements", IEEE Standards Activities Department, Piscataway, NJ, USA; Nov. 2016; XP068137446.
Notice of Allowance dated Sep. 15, 2020 for Korean Patent Application No. 10-2020-7026125 and its English translation by provided by Applicant's foreign counsel.
Office Action dated Feb. 3, 2020 for Japanese Patent Application No. 2019-500497 and its English translation provided by Applicant's foreign counsel.
Extended European Search Report dated Feb. 10, 2020 for European Patent Application No. 17824568.4.
Robert Stacey, Spec Framework, IEEE 802.11-15/0132r17, (IEEE 802.11-15/0132r15) URL:https://mentor.ieee.org/802.11/dcn/15/11-15-0132-17-00ax-spec-famework.docs, May 2, 2016, pp. 1-61.
Chittabrata Ghosh (Intel): "Signaling of Multi-TID Aggregation Limit", IEEE Draft: 11-16-0667-00-00AX-SIGNALING-OF-MULTI-TID-AGGREGATION-LIMIT, IEEE-SA Mentor, Piscataway, NJ USA, vol. 802.11-16/0667r0, URL:https://mentor.ieee.org/802.11/dcn/16/11-16-0667-00-00ax-signaling-of-multi-tid-aggregation-limit.pptx, Jun. 16, 2016, pp. 11-15.
Chittabrata Ghosh (Intel): "Multi-TID Aggregation Limit", IEEE Draft: 11-16-0362-01-00AX-MULTI-TID-AGGREGATION-LIMIT, IEEE-SA MENTOR, Piscataway, NJ USA, vol. 802.11-16/0362r1, Mar. 15, 2016, slides 1-16.
IEEE P802.11ax™/D0.2: "Draft Standard for Information technology-Tele-communications and information exchange between systems Local and metropolitan area networksp—Specific requirements. Part 11: Wireless LAN Medium Access Control (MAC) and Physical Layer (PHY) Specifications. Amendment 6: Enhancements for high efficiency in frequency bands between 1GHz and 6GHz", LAN/MAN Standards Committee of the IEE Computer Society, IEEE Draft: P802.11ax/D0.2, Jun. 8, 2016, pp. 20-23, pp. 36-38. URL: www.ieee802.org/11/private/Draft_Standards/11ax/DraftP802.11ax_D0.2.pdf.
International Preliminary Report on Patentability (Chapter I) dated Jun. 25, 2019 for PCT/KR2017/015265 and its English translation from WIPO.
Notice of Allowance dated Jul. 10, 2019 for U.S. Appl. No. 16/233,078.
Non-Final Office Action dated Mar. 18, 2019 for U.S. Appl. No. 16/233,078.
Oren Kedem (Intel): "IEEE P802.11 Wireless LANs", IEEE 802.11-15/TBD, Nov. 2015, pp. 1-5.
Notice of Allowance dated Oct. 20, 2020 for U.S. Appl. No. 16/449,132 (now published as US 2019/0319738).
Final Office Action dated May 1, 2020 for U.S. Appl. No. 16/449,132 (now published as US 2019/0319738).
Office Action dated Jan. 16, 2020 for U.S. Appl. No. 16/449,132 (now published as US 2019/0319738).
Office Action dated Sep. 16, 2019 for U.S. Appl. No. 16/449,132 (now published as US 2019/0319738).
Office Action dated Nov. 22, 2021 for Japanese Patent Application No. 2020-125359 and its English translation provided by Applicant's foreign counsel.
Office Action dated Nov. 22, 2021 for Japanese Patent Application No. 2020-125358 and its English translation provided by Applicant's foreign counsel.
Office Action dated Oct. 25, 2021 for U.S. Appl. No. 16/935,858.
Office Action dated Nov. 10, 2020 for Korean Patent Application No. 10-2019-7018255 and its English translation provided by Applicant's foreign counsel.
Jagit Singh Ashta et al.: "Performance improvement strategies for current and next generation Wi-Fi systems", Jun. 13, 2012, pp. 1-151.
Office Action dated Dec. 27, 2021 for Indian Patent Application No. 202128005900.
Office Action dated Dec. 9, 2021 for Chinese Patent Application No. 201780041848.0 and its English translation provided by Applicant's foreign counsel.
Notice of Allowance dated Dec. 13, 2021 for European Patent Application No. 17 824 568.4.
Notice of Allowance dated Jun. 29, 2022 for Chinese Patent Application No. 201780079155.0 and its English translation provided by Applicant's foreign counsel.
Office Action dated Jul. 4, 2022 for Japanese Patent Application No. 2021-071867 and its English translation provided by Applicant's foreign counsel.
Liwen Chu: "HE Variant HT Control—A-MPDU Content", Wireless LANs, IEEE 802.11-16/1186r1, Sep. 12, 2016, pp. 1-7.
Extended European Search Report dated Jul. 5, 2022 for European Patent Application No. 22166225.7.
Yongho Seok et al.: "HE MU Acknowledgement Procedure", IEEE 802.11-15/1278r1, Piscataway, NJ, USA, Nov. 10, 2015, Slides 1-13.
Notice of Allowance dated Aug. 3, 2022 for Chinese Patent Application No. 201780041848.0 and its English translation provided by Applicant's foreign counsel.
Office Action dated Aug. 25, 2022 for U.S. Appl. No. 17/157,978.
Office Action dated Sep. 29, 2022 for Korean Patent Application No. 10-2022-7027751 and its English translation provided by Applicant's foreign counsel.
Notice of Allowance dated Feb. 6, 2023 for Japanese Patent Application No. 2021-071867 and its English translation provided by Applicant's foreign counsel.
Office Action dated Feb. 15, 2023 for U.S. Appl. No. 17/851,035.
Office Action dated Mar. 16, 2023 for European Patent Application No. 17884228.2.
Notice of Allowance dated Jun. 14, 2023 for U.S. Appl. No. 17/851,035.
Office Action dated Jun. 26, 2023 for Japanese Patent Application No. 2022-096603 and its English translation provided by Applicant's foreign counsel.
Notice of Hearing dated Jul. 4, 2023 for Indian Patent Application No. 201927025421.
Notice of Allowance dated Jul. 10, 2023 for U.S. Appl. No. 17/851,035.
Notice of Hearing dated Jul. 11, 2023 for Indian Patent Application No. 201827048972.
Notice of Allowance dated Jul. 28, 2023 for Korean Patent Application No. 10-2022-7027751 and its English translation provided by Applicant's foreign counsel.

* cited by examiner (a)

(b)

AGGREGATED-MPDU, METHOD FOR TRANSMITTING RESPONSE FRAME THERETO, AND WIRELESS COMMUNICATION TERMINAL USING SAME

CROSS-REFERENCE TO RELATED APPLICATIONS

This application is a continuation of U.S. patent application Ser. No. 16/449,132 filed on Jun. 21, 2019, which is a continuation of International Patent Application No. PCT/KR2017/015265 filed on Dec. 21, 2017, which claims the priority to Korean Patent Application No. 10-2016-0175999 filed in the Korean Intellectual Property Office on Dec. 21, 2016, Korean Patent Application No. 10-2017-0048145 filed in the Korean Intellectual Property Office on Apr. 13, 2017, and Korean Patent Application No. 10-2017-0146357 filed in the Korean Intellectual Property Office on Nov. 4, 2017, the entire contents of which are incorporated herein by reference.

TECHNICAL FIELD

The present invention relates to a method for transmitting an aggregate MPDU and a response frame thereto and a wireless communication terminal using the same, and more particularly, to a wireless communication method and a wireless communication terminal for setting various formats of the aggregate MPDU and the response frame thereto and performing an efficient data communication by using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

The present invention has an object to set various formats of the aggregate MPDU and the response frame thereto and to use them to perform efficient data communication.

Technical Solution

In order to achieve the objects, the present invention provides a wireless communication method and a wireless communication terminal as below.

First, an exemplary embodiment of the present invention provides a wireless communication terminal, including: a processor; and a communication unit, wherein the processor generates an aggregate MPDU (A-MPDU) containing one or more MAC protocol data unit(s) (MPDU(s)) soliciting an immediate response, transmits the generated A-MPDU to a recipient, receives a response frame corresponding to the A-MPDU from the recipient, and determines whether a transmission of the MPDU(s) contained in the A-MPDU is successful based on the received response frame.

The processor may determine whether the transmission of the MPDU(s) contained in the A-MPDU is successful by considering at least one of the number of traffic ID (TID) soliciting an immediate response or MPDU delimiter information in the one or more MPDUs constituting the A-MPDU, and the response frame transmitted corresponding to the A-MPDU.

The processor may determine that the transmission of the MPDU(s) contained in the A-MPDU has failed when the A-MPDU consists of MPDUs of a plurality of TIDs soliciting an immediate response and a response frame transmitted corresponding to the A-MPDU is an Ack frame.

The processor may retransmit the MPDU(s) contained in the A-MPDU of which the transmission is determined to have failed.

The processor may determine that a channel access for a transmission of the A-MPDU is successful and reset at least one EDCA parameter of an access category used for the channel access.

The response frame for the A-MPDU may be generated based on at least one of the number of TIDs soliciting an immediate response in the MPDU(s) of the A-MPDU successfully received by the recipient or the MPDU delimiter information of the A-MPDU.

When the MPDU(s) successfully received by the recipient include MPDU soliciting an immediate response only one, and the MPDU soliciting the immediate response follows an MPDU delimiter with a value of an end of frame (EOF) field equal to 1 and a value of an MPDU length field not equal to 0, the response frame for the A-MPDU may be an Ack frame.

When the MPDU(s) successfully received by the recipient include one or more MPDUs of only one TID soliciting an immediate response, and the MPDU soliciting the immediate response follows an MPDU delimiter with a value of an EOF field equal to 0, the response frame for the A-MPDU may be a compressed BlockAck frame.

When the MPDU(s) successfully received by the recipient include MPDUs of a plurality of TIDs soliciting an immediate response or include MPDUs of one or more TIDs soliciting an immediate response and an Action frame, the response frame for the A-MPDU may be a multi-STA BlockAck frame.

When at least one MPDU or MPDU delimiter in the A-MPDU is not successfully received by the recipient, the response frame for the A-MPDU may be a multi-STA BlockAck frame.

When at least one MPDU or MPDU delimiter is not successfully received prior to a first received EOF padding in the A-MPDU, the response frame for the A-MPDU may be a multi-STA BlockAck frame.

The recipient may response to the A-MPDU by the multi-STA BlockAck frame when the recipient can transmit the multi-STA BlockAck frame within a duration indicated by a successfully received MPDU or within a length indicated by a trigger information received from the A-MPDU.

In addition, an exemplary embodiment of the present invention provides a wireless communication method of a wireless communication terminal, including: generating an aggregate MPDU (A-MPDU) containing one or more MAC protocol data unit(s) (MPDU(s)) soliciting an immediate response; transmitting the generated A-MPDU to a recipient; receiving a response frame corresponding to the A-MPDU from the recipient; and determining whether a transmission of the MPDU(s) contained in the A-MPDU is successful based on the received response frame.

Next, another embodiment of the present invention provides a wireless communication terminal, including: a processor; and a communication unit, wherein the processor receives an aggregate MPDU (A-MPDU) consisting of one or more MPDUs, determines a format of a response frame for the received A-MPDU, and transmits a response frame of the determined format.

The format of the response frame for the A-MPDU is determined based on at least one of the number of TIDs soliciting an immediate response in the MPDU(s) successfully received in the A-MPDU and MPDU delimiter information of the A-MPDU.

When the successfully received MPDU(s) include MPDU soliciting an immediate response only one, and the MPDU soliciting the immediate response follows an MPDU delimiter with a value of an end of frame (EOF) field equal to 1 and a value of an MPDU length field not equal to 0, the response frame for the A-MPDU may be determined to be an Ack frame.

When the successfully received MPDU(s) include one or more MPDUs of only one TID soliciting an immediate response, and the MPDU soliciting the immediate response follows an MPDU delimiter with a value of an EOF field equal to 0, the response frame for the A-MPDU may be determined to be a compressed BlockAck frame.

When the successfully received MPDU(s) include MPDUs of a plurality of TIDs soliciting an immediate response or include MPDUs of one or more TIDs soliciting an immediate response and an Action frame, the response frame for the A-MPDU may be determined to be a multi-STA BlockAck frame.

When at least one MPDU or MPDU delimiter in the A-MPDU is not successfully received by the recipient, the response frame for the A-MPDU may be a multi-STA BlockAck frame.

When at least one MPDU or MPDU delimiter is not successfully received prior to a first received EOF padding in the A-MPDU, the response frame for the A-MPDU may be determined to be a multi-STA BlockAck frame.

When the multi-STA BlockAck frame can be transmitted within a duration indicated by a successfully received MPDU in the A-MPDU or within a length indicated by a trigger information received in the A-MPDU, the response frame for the A-MPDU may be determined to be a multi-STA BlockAck frame.

When the successfully received MPDU(s) include only one MPDU soliciting an immediate response and a trigger frame, and the MPDU soliciting the immediate response follows an MPDU delimiter with a value of an end of frame (EOF) field equal to 1 and a value of an MPDU length field not equal to 0, the response frame for the A-MPDU may be determined to be an Ack frame.

In addition, another exemplary embodiment of the present invention provides a wireless communication method of a wireless communication terminal, including: receiving an aggregate MPDU (A-MPDU) consisting of one or more MPDUs; determining a format of a response frame for the received A-MPDU; and transmitting a response frame of the determined format.

Advantageous Effects

According to an embodiment of the present invention, it is possible to set an aggregate MPDU and a response frame thereto in various formats and to perform efficient data communication.

According to an embodiment of the present invention, it is possible to increase the total resource utilization rate in the contention-based channel access system and improve the performance of the wireless LAN system.

DETAILED DESCRIPTION OF THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2016-0175999, 10-2017-0048145 and 10-2017-0146357 filed in the Korean Intellectual Property Office and the embodiments and mentioned items described in the respective application, which forms the basis of the priority, shall be included in the Detailed Description of the present application.

Figure 1:
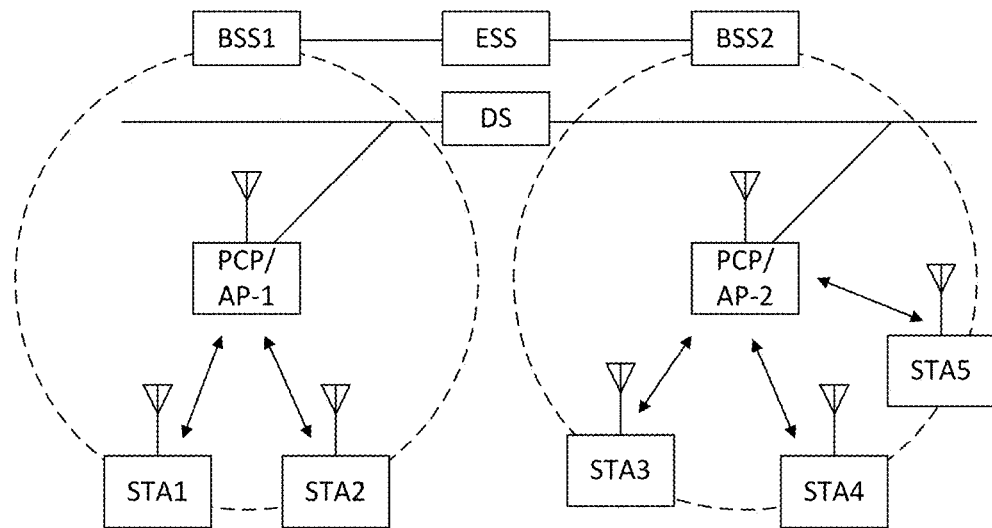
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
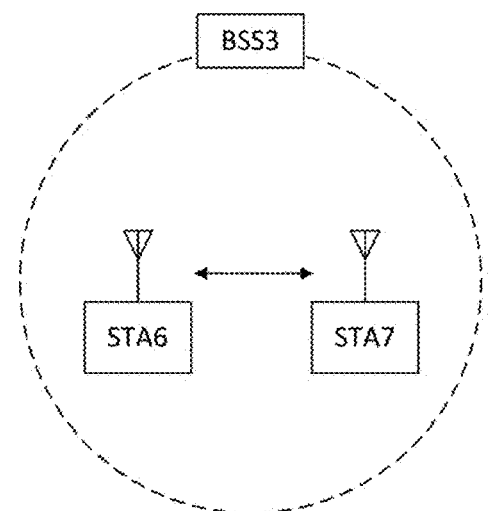
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
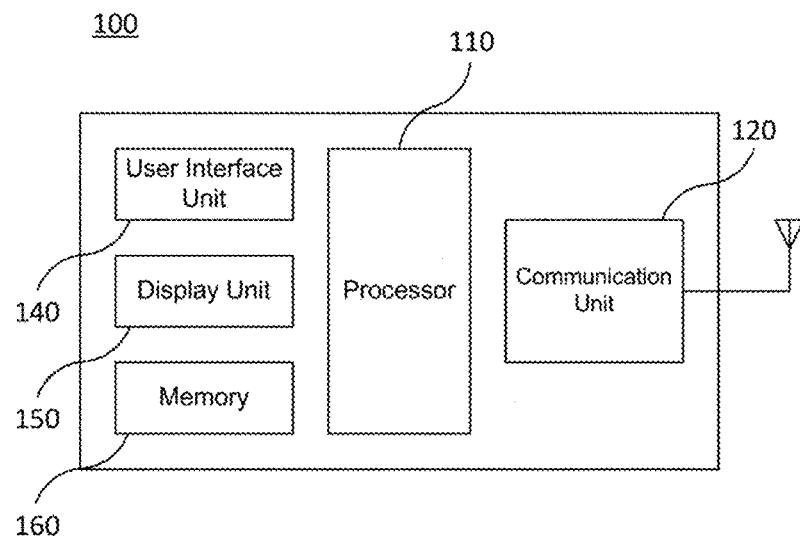
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, and 60 GHz. According to an embodiment, the station 100 may include a communication module using a frequency band of 6 GHz or more and a communication module using a frequency band of 6 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
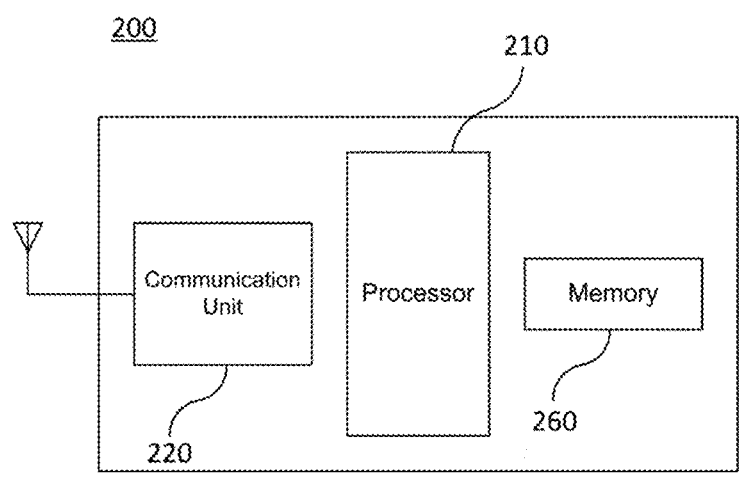
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, and 60 GHz together. Preferably, the AP 200 may include a communication module using a frequency band of 6 GHz or more and a communication module using a frequency band of 6 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
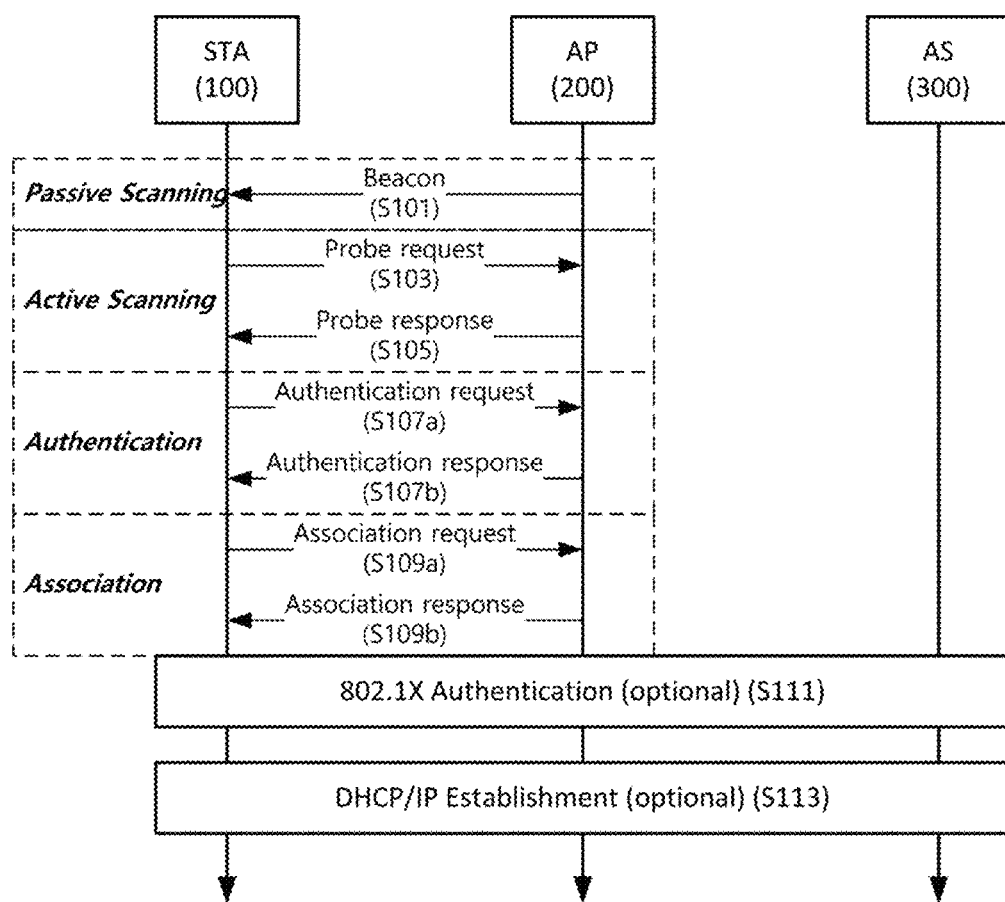
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Aggregate MPDU (A-MPDU)

Figure 6:
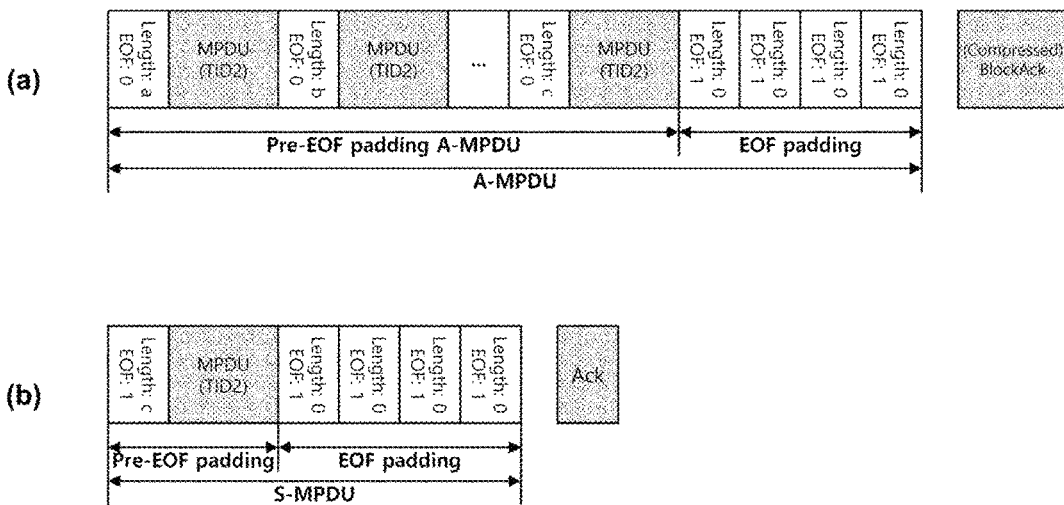
FIG. 6 illustrates an embodiment of an MPDU aggregation method of a wireless LAN packet.

FIG. 6 illustrates an embodiment of a MAC protocol data unit (MPDU) aggregation method of a wireless LAN packet. In a contention-based wireless LAN system, a terminal has to perform a contention for channel occupation whenever it attempts to transmit data. Therefore, as the density of the terminals in the BSS and the amount of transmission data per terminal increase, the efficiency of the actual data transmission amount compared to the contention time may be drastically reduced.

In order to solve such a problem and increase the data transmission efficiency of the terminals, an aggregate MPDU (A-MPDU) as illustrated in FIG. 6 may be used. The A-MPDU consists of one or more A-MPDU subframes and a variable amount of end of frame (EOF) padding in that order. Each A-MPDU subframe may contain an MPDU delimiter, and optionally contain an MPDU following it. The MPDU delimiter indicates information for the MPDU contained in the corresponding A-MPDU subframe. More specifically, the MPDU delimiter contains an end of frame (EOF) field, an MPDU length field, a cyclic redundancy check (CRC) field, and an MPDU signature field. The EOF length field indicates the length of the MPDU. If no MPDU is present in the MPDU subframe, the MPDU length field is set to 0. In addition, the CRC field is used to detect errors of the MPDU delimiter, and the MPDU signature field represents the pattern which can be used by the recipient to detect the MPDU delimiter.

Hereinafter, in the embodiments of the present invention, an MPDU may also be used as a term indicating an A-MPDU subframe consisting of the corresponding MPDU for convenience. For example, an MPDU with the value of an EOF field set to 1 may indicate an A-MPDU subframe with the value of an EOF field set to 1 or an MPDU constituting that A-MPDU subframe. More specifically, an MPDU with the value of an EOF field set to 1 may indicate an A-MPDU subframe containing an MPDU delimiter with the value of an EOF field set to 1 or an MPDU constituting that A-MPDU subframe. Also, in the embodiments of the present invention, a recipient may be used as a term indicating a terminal receiving an A-MPDU and transmitting a response frame thereto.

FIG. 6(a) illustrates an embodiment of the configuration of an A-MPDU. As illustrated, the A-MPDU may contain one or more A-MPDU subframes (i.e., a pre-EOF padding portion) and an EOF padding portion. In the case of a traffic ID (TID) in which a Block Ack (BA) agreement has been performed, a plurality of data frames (or data MPDUs) may be transmitted together via a single A-MPDU. In this case, in the MPDU delimiter for each MPDU, the value of the EOF field is set to 0 and the value of the MPDU length field is set to a non-zero value. Referring to FIG. 6(a), a plurality of data MPDUs belonging to TID2 are transmitted via a single A-MPDU. In the EOF padding portion following the pre-EOF padding portion, one or more EOF delimiters with the value of the EOF field set to 1 and the value of the MPDU length field set to 0 are transmitted to indicate the end of the A-MPDU transmission.

FIG. 6(b) illustrates an embodiment of the construction of a single MPDU (S-MPDU). The above-described configuration of the A-MPDU may be inefficient if the transmitter intends to transmit one MPDU. More specifically, if an A-MPDU is used, an MPDU delimiter should be inserted for every MPDU, and a BlockAck based response including a BA bitmap may be requested. Meanwhile, in the 802.11ac wireless LAN system, all data transmitted in the PHY protocol data unit (PPDU) format of the VHT PPDU is defined to be transmitted through an MPDU format of the A-MPDU. Therefore, in order to improve the inefficient transmission structure in the above situation, the S-MPDU format may be used when only one MPDU is transmitted in the PPDU. In the MPDU delimiter of the data MPDU solely transmitted in the S-MPDU format, the value of the EOF field is set to 1 and the value of the MPDU length field is set to a non-zero value. As in the A-MPDU format, EOF padding may also be used in the S-MPDU format. When an S-MPDU is received, the recipient may respond with a normal Ack rather than a BlockAck regardless of whether a Block Ack agreement has been performed between the transmitter and the recipient.

Figure 7:
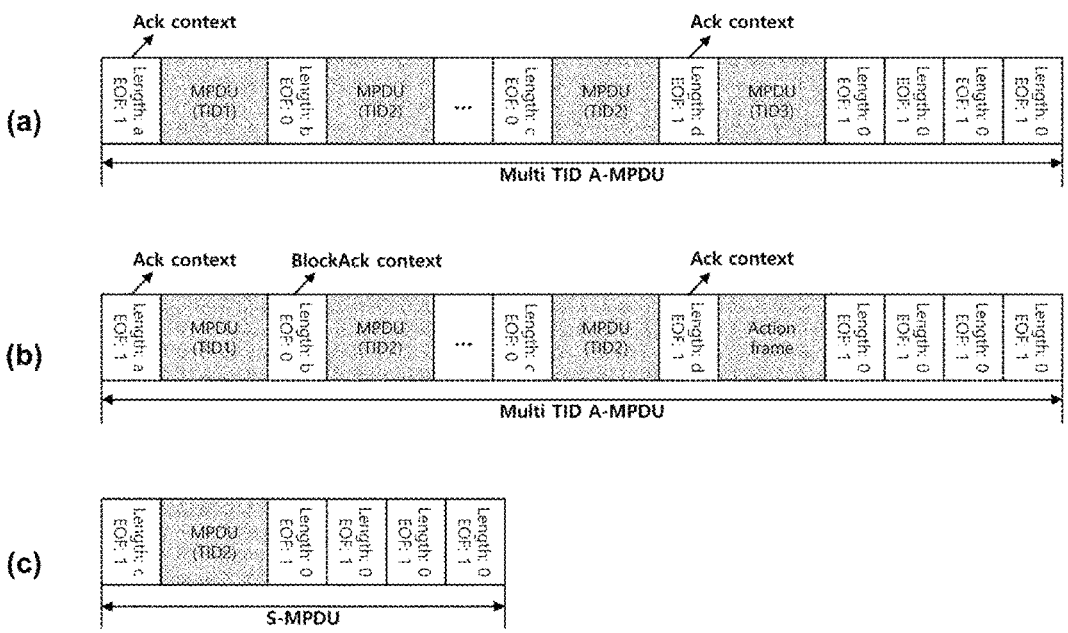
FIG. 7 illustrates an embodiment of an MPDU aggregation method of a wireless LAN packet in a non-legacy wireless LAN system.

FIG. 7 illustrates an embodiment of an MPDU aggregation method of a wireless LAN packet in a non-legacy wireless LAN system. In the embodiment of the present invention, the non-legacy wireless LAN system may refer to a wireless LAN system conforming to an IEEE 802.11ax standard, and the non-legacy wireless LAN packet may refer to a high efficiency (HE) PPDU conforming to that standard. However, the present invention is not limited thereto.

In legacy wireless LAN systems prior to the IEEE 802.11ax standard, there was a restriction that all the MPDUs contained in an A-MPDU should belong to the same TID. For example, a data MPDU and an Action frame could not be aggregated into a single A-MPDU. In addition, since MPDUs of different TIDs cannot be contained in the A-MPDU, if a data MPDU with the value of the EOF field of 1 is contained in the received A-MPDU, the recipient identified the corresponding data MPDU to be the only MPDU which is contained in the A-MPDU. Therefore, the recipient may regard the A-MPDU as an S-MPDU and respond with a general Ack.

However, in the non-legacy wireless LAN system, an A-MPDU in which MPDUs of a plurality of TIDs are aggregated may be transmitted in a multi-user (MU) transmission or a single-user (SU) transmission satisfying a certain condition. As such, the A-MPDU in which MPDUs of a plurality of TIDs are aggregated is called a multi-TID A-MPDU. The multi-TID A-MPDU of the non-legacy wireless LAN system may contain one or more A-MPDU subframes with the value of the EOF field set to 1.

Each MPDU of one or more A-MPDU subframes with the value of the EOF field set to 1 should belong to a different TID and should be the only MPDU of the corresponding TID in the A-MPDU. That is, the A-MPDU subframe containing the MPDU delimiter with the value of the EOF field set to 1 consists of an MPDU or an Action frame soliciting a response of the general Ack. As illustrated in FIG. 7(a), the EOF field value of an MPDU delimiter preceding the only MPDU of the specific TID (i.e., the MPDU of TID1 and the MPDU of TID3) in the A-MPDU may be set to 1. Here, even in the case of Quality of Service (QoS) data MPDU of a TID for which the Block Ack agreement has been performed, the EOF field value of the MPDU delimiter is set to 1 when the MPDU is the only MPDU of the TID in the A-MPDU. In addition, as illustrated in FIG. 7(b), the Action frame soliciting a response of the general Ack may also be aggregated with other data MPDUs. In this case, a maximum of one Action frame may be aggregated in the A-MPDU, and the value of the EOF field of the MPDU delimiter preceding the Action frame may be set to 1.

On the other hand, a data MPDU of a TID for which the Block Ack agreement is not performed may be aggregated together with a data MPDU of another TID by setting the value of the EOF field of the corresponding MPDU delimiter to 1. If the Block Ack agreement is not performed, frames of the corresponding TID do not basically support the response of BlockAck. However, since the multi-STA BlockAck (hereinafter, M-BA) supports the Ack context, the response to the MPDU of the corresponding TID can be performed using the M-BA. If the data MPDU of the TID for which the Block Ack agreement is not performed is transmitted via an A-MPDU, it is apparent that the MPDU is the only MPDU of the corresponding TID. Therefore, according to an embodiment of the present invention, when the data MPDU of the TID for which the Block Ack agreement is not performed is transmitted via the A-MPDU, the value of the EOF field of the corresponding MPDU delimiter may be set to 0. However, even in this case, when one or more other MPDUs aggregated together in the A-MPDU solicit an immediate response, the response to the MPDU of the corresponding TID may be performed using the M-BA.

In addition, one or more MPDUs of the TIDs for which the Block Ack agreement has been performed may be aggregated into the same A-MPDU by setting the value of the EOF field of the corresponding MPDU delimiter to 0. That is, one or more A-MPDU subframes with the value of the EOF field equal to 0 may be aggregated together with an A-MPDU subframe with the value of the EOF field equal to 1. In the legacy wireless LAN system, when the value of the EOF field of the first MPDU delimiter of the received A-MPDU is 1, the MPDU of the corresponding A-MPDU subframe may be regarded as the only MPDU transmitted via the A-MPDU. That is, the received A-MPDU could be regarded as the S-MPDU illustrated in FIG. 7(c). However, in the non-legacy wireless LAN system, whether the A-MPDU is an S-MPDU, a (single-TID) A-MPDU, or a multi-TID A-MPDU can be determined after identifying the subsequent MPDU delimiters and MPDUs The recipient of the above-described S-MPDU, A-MPDU, or multi-TID A-MPDU may transmit a response based on an acknowledgment context. According to the embodiment of the present invention, the acknowledgment context may include a BlockAck context, an Ack context, an All Ack context, and the like, and specific embodiments thereof will be described later. According to the embodiment of the present invention, an A-MPDU subframe in which the value of the EOF field is set to 1 may indicate the Ack context. If the MPDU of the A-MPDU subframe with the value of the EOF field equal to 1 is transmitted alone via the A-MPDU, the response to the corresponding MPDU may be performed using an Ack frame. However, if the MPDU of the A-MPDU subframe with the value of the EOF field equal to 1 is aggregated and transmitted together with other frames soliciting an immediate response, the response to the corresponding MPDU may be performed using an M-BA frame.

When a response to the MPDU of the A-MPDU subframe with the value of the EOF field equal to 1 is performed using the M-BA frame, the response to the MPDU is received through a per AID TID information field in which BA bitmap is omitted from the M-BA. More specifically, the acknowledgment context included in each per AID TID information in the M-BA frame may be indicated via an Ack type subfield in the per AID TID information field. According to an embodiment, a value of the Ack type subfield equal to 1 may indicate an Ack context, and a value of the Ack type subfield equal to 0 may indicate a BlockAck context. Accordingly, when a response to the MPDU of the A-MPDU subframe with the value of the EOF field equal to 1 is performed using the M-BA frame, the response to the MPDU may be received through a per AID TID Information field in which the value of the Ack type subfield is set to 1. That is, the value of the Ack type subfield (i.e., Ack type subfield=1) of the per AID TID information field including the response information for the MPDU is set differently from the value of the Ack type subfield (i.e., Ack type subfield=0) of the other per AID TID information field soliciting an BA bitmap.

Figure 8:
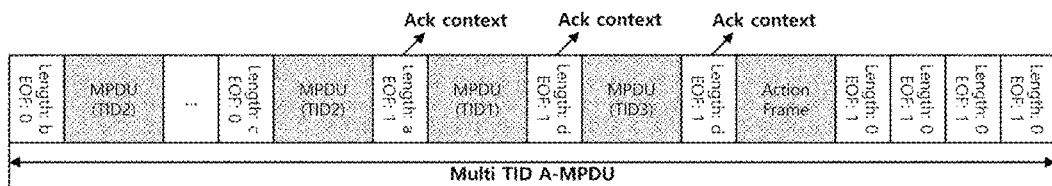
FIG. 8 illustrates another embodiment of an MPDU aggregation method of a wireless LAN packet in a non-legacy wireless LAN system.

FIG. 8 illustrates another embodiment of an MPDU aggregation method of a wireless LAN packet in a non-legacy wireless LAN system. As described above, as the multi-TID A-MPDU is used in the non-legacy wireless LAN system, an A-MPDU subframe in which the value of the EOF field is set to 1 may exist at most one for each TID in one A-MPDU. That is, in one A-MPDU, an A-MPDU subframes in which the value of the EOF field is set to 1 and a plurality of A-MPDU subframes in which the value of the EOF field is set to 0 may coexist.

In the single-TID A-MPDU used in the legacy wireless LAN system, an MPDU delimiter with the EOF value equal to 0 could not follow an MPDU delimiter with the EOF value equal to 1. However, in the multi-TID A-MPDU used in the non-legacy wireless LAN system, since the A-MPDU subframe with the value of the EOF field equal to 0 and the A-MPDU subframe with the value of the EOF field equal to 1 are mixed, EOF values of the MPDU delimiters can be randomly arranged. According to an embodiment of the present invention, an arrangement method of a plurality of MPDUs in a multi-TID A-MPDU may be configured to comply with the conventional MPDU arrangement rule in an A-MPDU.

More specifically, according to an embodiment of the present invention, an A-MPDU subframe in which the value of the EOF field is set to 1 may be set to be located between an A-MPDU subframe in which the value of the EOF field is set to 0 and an EOF padding. More specifically, the arrangement of MPDU delimiters (or A-MPDU subframes) in the A-MPDU may be set in the following order.

First group: MPDU delimiters (MPDU delimiters for MPDUs of TID2 in the embodiment of FIG. 8) in which the value of the EOF field is set to 0 and the value of the MPDU length field is set to a non-zero value.

Second group: MPDU delimiter(s) (MPDU delimiter for MPDU of TID1, MPDU delimiter for MPDU of TID3, and MPDU delimiter for Action frame in the embodiment of FIG. 8) in which the value of the EOF field is set to 1 and the value of the MPDU length field is set to a non-zero value.

Third group: MPDU delimiter(s) (EOF padding portion in the embodiment of FIG. 8) in which the value of the EOF field is set to 1 and the value of the MPDU Length field is set to 0.

That is, the arrangement of the MPDU delimiters in the A-MPDU may be set in the order of the first group, the second group, and the third group. According to an embodiment, there may be no additional limitation on the arrangement order of the MPDUs within the first group and/or the arrangement order of the MPDUs within the second group. That is, the arrangement of a plurality of MPDUs belonging to the same group may not be continuous for each same TID, and there may be no restriction on the order of TIDs.

Figure 9:
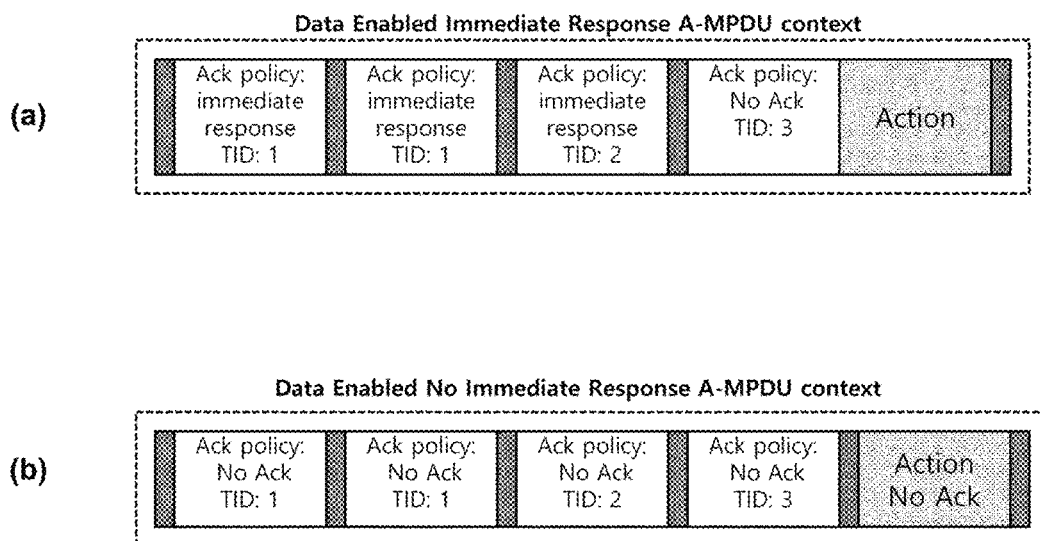
FIG. 9 illustrates yet another embodiment of an MPDU aggregation method of a wireless LAN packet in a non-legacy wireless LAN system.

FIG. 9 illustrates yet another embodiment of an MPDU aggregation method of a wireless LAN packet in a non-legacy wireless LAN system. The A-MPDU may aggregate multiple MPDUs into one PHY service data unit (PPDU). In this case, MPDUs of various kinds of frames can be aggregated into the A-MPDU. More specifically, QoS data frame, QoS Null frame, Action frame, action No Ack frame, control frame, and the like can be aggregated into one A-MPDU. Among them, an A-MPDU containing the QoS data frame may be classified into a data enabled immediate response (DEIR) context and a data enabled no immediate response (DENIR) context depending on whether a data frame solicits an immediate response.

Whether a data frame solicits an immediate response may be indicated through an Ack policy subfield of the QoS control field of the MAC header. According to an embodiment, the Ack policy subfield may indicate the acknowledgment policy for data via four different field values.

First, if the Ack policy subfield is set to the first value, the recipient responds to a data frame with a general Ack or an implicit BlockAck. If the acknowledgment policy is general Ack or implicit BlockAck, an immediate response to the data frame is solicited. That is, the recipient transmits an Ack frame or a BlockAck frame a SIFS after a PPDU carrying the data frame. In this case, the BlockAck frame may be transmitted individually or as a part of the A-MPDU.

Next, when the Ack policy subfield is set to the second value, a response to the corresponding data frame is not solicited. That is, when the Ack policy subfield is set to the second value, the acknowledgment policy may be identified as No Ack.

Next, when the Ack policy subfield is set to the third value, a non-explicit Ack is solicited. If the acknowledgment policy is non-explicit Ack, a response to the data frame is performed, but the response is not an Ack frame. According to a further embodiment of the present invention, if the Ack policy subfield is set to the third value, an HE TB PPDU (HTP) Ack may be solicited. If the data frame is transmitted through a PPDU soliciting a high efficiency trigger-based (HE TB) PPDU and the acknowledgment policy of the data frame is HTP Ack, the recipient responds to the data frame via the HE TB PPDU.

Finally, if the Ack policy subfield is set to the fourth value, a BlockAck is solicited. If the acknowledgment policy is BlockAck, the recipient takes no action, except to record its status upon receipt of the frame. The recipient may perform a response when a BlockAck request frame is received.

Information indicating whether or not a data frame solicits an immediate response is designated in the form of QoSAck or QosNoAck through a service class for each TID in a MAC service access point (SAP) which is a part of an upper layer of the MAC. In a TID for which the service class is designated as QoSNoAck, the Block Ack agreement is not performed, and the value of the Ack policy subfield of a frame of the corresponding TID is set to indicate the second value, i.e., No Ack.

In a legacy wireless LAN system, MPDUs of only one TID could be transmitted through one A-MPDU. Therefore, when a QoS data frame or QoS Null frame of a TID soliciting an immediate response is aggregated, the corresponding A-MPDU is automatically classified into a DEIR context. In addition, when a QoS data frame or QoS Null frame of a TID not soliciting an immediate response is aggregated, the corresponding A-MPDU is automatically classified into a DENIR context. Therefore, in the legacy wireless LAN system, a frame of a TID for which the service class is QoSAck and a frame of the another TID for which the service class is QoSNoAck could not be aggregated into one A-MPDU. However, in the non-legacy wireless LAN system, aggregation of MPDUs of different TIDs is allowed through a multi-TID A-MPDU. Therefore, in the non-legacy wireless LAN system, it is necessary to modify the context for the A-MPDU in which the frame of the TID for which the service class is QoSAck and the frame of the another TID for which the service class is QoSNoAck are aggregated together.

First, FIG. 9(a) illustrates an A-MPDU of the DEIR context according to an embodiment of the present invention. An A-MPDU in which a frame of a TID for which the service class is QoSAck and a frame of another TID for which the service class is QoSNoAck are aggregated can be classified into a DEIR context because an immediate response is solicited by the TID for which the service class is QoSAck. According to an embodiment of the present invention, a frame for which the acknowledgment policy is No Ack may be selectively aggregated into an A-MPDU of the DEIR context only if at least one of a frame for which the acknowledgment policy is Ack (or implicit BlockAck), a frame for which the acknowledgment policy is HTP Ack, a frame for which the acknowledgment policy is BlockAck, and an Action frame exists in the A-MPDU.

Figure 10:
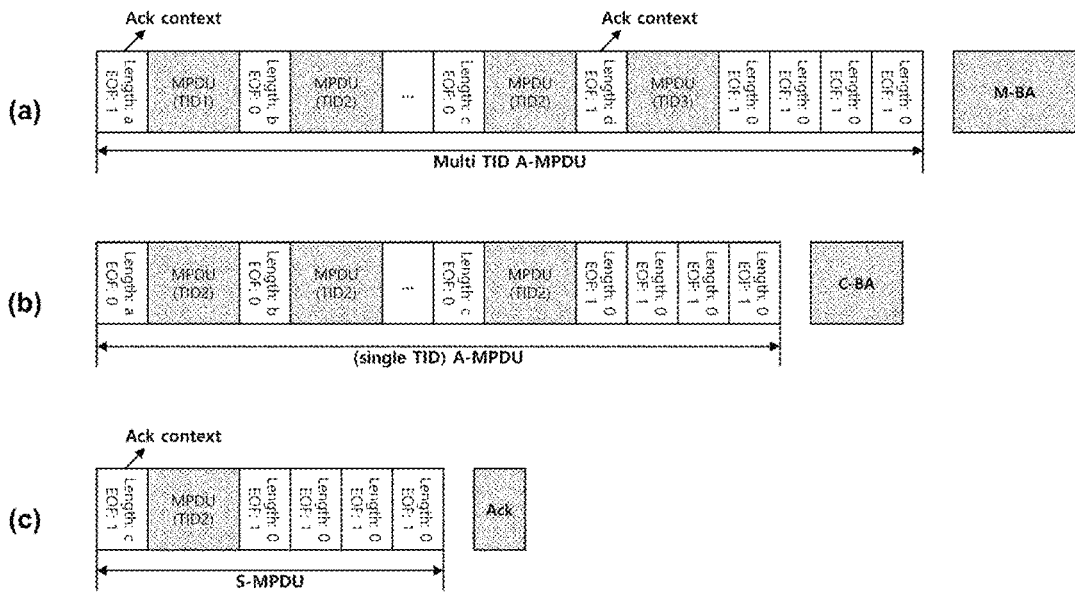
FIG. 10 illustrates an embodiment of a response method according to the format of an A-MPDU.

Next, FIG. 9(b) illustrates an A-MPDU of the DENIR context according to an embodiment of the present invention. According to the embodiment of the present invention, frames of a plurality of TIDs for which the acknowledgment policy is No Ack may be aggregated together in the A-MPDU of the DENIR context. In addition, frames of one or more TIDs for which the acknowledgment policy is No Ack and Action No Ack frames may be aggregated together in the A-MPDU of the DENIR context Response Frame for the A-MPDU FIG. 10 illustrates an embodiment of a response method according to the format of an A-MPDU. As described above, in the non-legacy wireless LAN system, an A-MPDU having the following format can be used. i) A-MPDU in which a plurality of MPDUs belonging to different TIDs are aggregated (embodiment of FIG. 10(a)). ii) A-MPDU in which a plurality of MPDUs belonging to a single TID are aggregated (embodiment of FIG. 10(b)). iii) A-MPDU containing a single MPDU (embodiment of FIG. 10(c)).

Therefore, the structure of the response frame may be different according to the format of the A-MPDU received by the recipient. According to the embodiment of the present invention, the following response frame may be transmitted for each format of the A-MPDU.

1) Ack frame: If MPDU with the value of the EOF field set to 1 is present only one in the received A-MPDU. Alternatively, if MPDU soliciting an immediate response is present only one in the received A-MPDU.

2) Compressed BlockAck (C-BA) frame: Among the received A-MPDU, if MPDUs soliciting an immediate response belong to the same TID. Alternatively, if the received A-MPDU consists of MPDUs of only one TID soliciting an immediate response and frames of other TID not soliciting an immediate response. In this case, the frame not soliciting an immediate response may include an Action No Ack frame, a QoS data frame for which the acknowledgment policy is BlockAck or No Ack, a QoS Null frame for which the acknowledgment policy is BlockAck or No Ack, and the like.

3) Multi-STA BlockAck (M-BA) frame: If the received A-MPDU consists of MPDUs of two or more TIDs soliciting an immediate response. Alternatively, if the received A-MPDU is configured to include MPDUs of one or more TIDs soliciting an immediate response and an Action frame. When a response is transmitted via the M-BA frame, a response may be performed through the per AID TID information field which is independent for each TID. If an MPDU with the value of the EOF field set to 1 is present in the received A-MPDU, the value of the Ack type subfield of the per AID TID information field corresponding to the MPDU may be set to 1 so that the BA bitmap is omitted.

Figure 11:
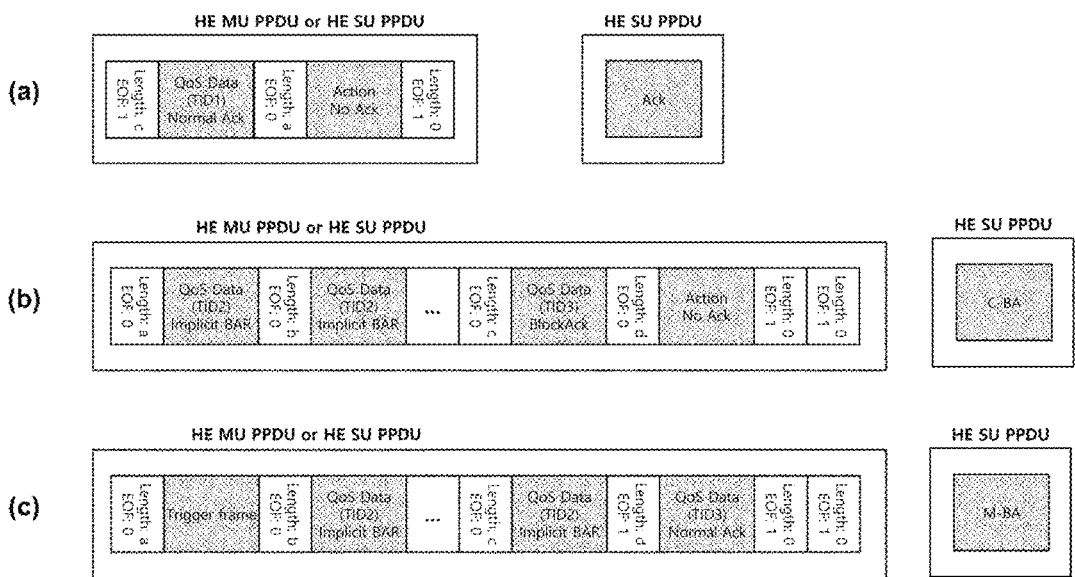
FIG. 11 illustrates an embodiment of a method that a terminal transmits a response frame for an A-MPDU.

FIG. 11 illustrates an embodiment of a method that a terminal transmits a response frame for an A-MPDU. As described above, in a non-legacy wireless LAN system, a transmitter may transmit a multi-TID A-MPDU and a different acknowledgment policy can be designated for each TID in one A-MPDU. In addition, a recipient may transmit a response using either an Ack frame, a BlockAck frame, or a M-BA frame based on the format of the received A-MPDU. A non-AP STA may not simultaneously receive data from a plurality of terminals unlike an AP. Therefore, the STA may perform a response for the A-MPDU based on information included in the received A-MPDU, the presence of uplink multi-user trigger information in the A-MPDU, and the like.

FIG. 11 illustrates embodiments of a response method of a STA when MPDU with the acknowledgment policy set to HTP Ack is not present in the received A-MPDU. The A-MPDU transmitted by the AP may be carried via a high efficiency single-user (HE SU) PPDU or a high efficiency multi-user (HE MU) PPDU, and the STA receives the PPDU. If the acknowledgment policy of the MPDU contained in the received A-MPDU is set to HTP Ack, the recipient should perform a response in HE-TB PPDU format. However, if MPDU with the acknowledgment policy set to HTP Ack is not present in the received A-MPDU, the STA may perform a response in HE SU PPDU format.

In this case, the STA may respond with either an Ack frame, a BlockAck frame, or an M-BA frame carried in the HE SU PPDU based on the format of the received A-MPDU. According to an embodiment, the STA may determine the format of the response frame considering, in the successfully received MPDU(s) of the A-MPDU, the number of TIDs soliciting an immediate response, the MPDU delimiter information of the A-MPDU, and the like. More specifically, the STA may determine the format of the response frame based on a combination of at least one of the following information included in the successfully received MPDU(s) in the A-MPDU. i) The number of TIDs soliciting an immediate response, ii) the presence or the number of MPDU delimiters with the value of the EOF field equal to 1 and the value of the MPDU length field not equal to 0, iii) the number of MPDUs soliciting a response in the Ack context, and iv) the number of MPDUs with no Block Ack agreement.

First, FIG. 11(a) illustrates an embodiment in which the STA responds to an A-MPDU with an Ack frame carried in an HE SU PPDU. According to the embodiment of the present invention, if the MPDU successfully received in the A-MPDU is the only MPDU soliciting an immediate response of the Ack context (i.e., the received A-MPDU is identified as the S-MPDU), the STA responds with the Ack frame. Also, if the MPDU(s) successfully received in the A-MPDU include only one MPDU soliciting an immediate response of the Ack context and one or more other MPDUs not soliciting an immediate response, the STA responds with the Ack frame. That is, if the MPDU(s) successfully received in the A-MPDU include only one MPDU soliciting an immediate response, the STA responds with the Ack frame.

In this case, the MPDU soliciting an immediate response of the Ack context may include an Action frame, a QoS data frame in which the acknowledgment policy is general Ack, a QoS Null frame in which the acknowledgment policy is general Ack, and the like. According to an embodiment of the present invention, the MPDU soliciting an immediate response of the Ack context may follow an MPDU delimiter with the value of the EOF field equal to 1 and the value of the MPDU length field not equal to 0. Further, the MPDU not soliciting an immediate response may include an Action No Ack frame, a QoS data frame in which the acknowledgment policy is BlockAck or No Ack, a QoS Null frame in which the acknowledgment policy is BlockAck or No Ack, and the like.

According to a further embodiment of the present invention, the STA may respond with an M-BA frame if the received A-MPDU is identified as containing only one MPDU soliciting an immediate response of the Ack context. In this case, the STA may insert only one per AID TID information field in the M-BA frame to perform the response of the Ack context. However, since the length of the M-BA frame is longer than the length of the Ack frame, the STA may response with the M-BA frame only when transmission is possible using a modulation and coding scheme (MCS) according to a specified rule within a duration indicated by the received MPDU.

Next, FIG. 11(b) illustrates an embodiment in which the STA responds to an A-MPDU with a compressed BlockAck (C-BA) frame carried in an HE SU PPDU. According to the embodiment of the present invention, when the received A-MPDU is identified as a single-TID A-MPDU, the STA responds with a compressed BlockAck (C-BA) frame. That is, if the MPDU(s) successfully received in the A-MPDU include one or more MPDUs of only one TID soliciting an immediate response, the STA responds with the C-BA frame. Also, if the MPDU(s) successfully received in the A-MPDU include one or more MPDUs of only one TID soliciting an immediate response and one or more other MPDUs not soliciting an immediate response, the STA responds with the C-BA frame. In other words, if all of the MPDUs soliciting an immediate response among the successfully received MPDU(s) of the A-MPDU belong to the same TID, the STA responds with the C-BA frame.

In this case, the MPDU soliciting an immediate response may include a QoS data frame in which the acknowledgment policy is implicit BlockAck, a QoS Null frame in which the acknowledgment policy is implicit BlockAck, and the like. According to an embodiment of the present invention, a frame in which the acknowledgment policy is implicit BlockAck may solicit an immediate response of the Block-Ack context. According to an embodiment, the MPDU soliciting an immediate response of the BlockAck context may follow an MPDU delimiter with the value of the EOF field equal to 0 and the value of the MPDU length field not equal to 0. Further, the MPDU not soliciting an immediate response may include an Action No Ack frame, a QoS data frame in which the acknowledgment policy is BlockAck or No Ack, a QoS Null frame in which the acknowledgment policy is BlockAck or No Ack, and the like. According to a further embodiment of the present invention, the STA may also respond with an M-BA frame if the received A-MPDU is identified as a single-TID A-MPDU.

Next, FIG. 11(c) illustrates an embodiment in which the STA responds to an A-MPDU with a multi-STA BlockAck (M-BA) frame carried in an HE SU PPDU.

According to the embodiment of the present invention, when the received A-MPDU is identified as a multi-TID A-MPDU, the STA responds with a multi-STA BlockAck (M-BA) frame. That is, if the MPDU(s) successfully received in the A-MPDU include MPDUs of two or more TIDs soliciting an immediate response, the STA responds with the M-BA frame. Also, if the MPDU(s) successfully received in the A-MPDU include MPDUs of one or more TIDs soliciting an immediate response and an Action frames, the STA responds with the M-BA frame.

According to a further specific embodiment, the STA may respond with the M-BA frame if the received A-MPDU satisfies at least one of the following conditions: i) The A-MPDU contains MPDUs of two or more TIDs soliciting an immediate response of the BlockAck context. ii) The A-MPDU contains MPDUs of one or more TIDs soliciting an immediate response of the BlockAck context and MPDUs of one or more TIDs soliciting an immediate response of the Ack context. iii) The A-MPDU contains MPDUs of two or more TIDs soliciting an immediate response of the Ack context. iv) The A-MPDU contains MPDUs of one or more TIDs soliciting an immediate response of the BlockAck context or Ack context and an Action frame.

In this case, the MPDU soliciting an immediate response of the BlockAck context may include a QoS data frame in which the acknowledgment policy is implicit BlockAck, a QoS Null frame in which the acknowledgment policy is implicit BlockAck, and the like. According to an embodiment, the MPDU soliciting an immediate response of the BlockAck context may follow an MPDU delimiter with the value of the EOF field equal to 0 and the value of the MPDU length field not equal to 0. Further, the MPDU soliciting an immediate response of the Ack context may include an Action frame, a QoS data frame in which the acknowledgment policy is general Ack, a QoS Null frame in which the acknowledgment policy is general Ack, and the like. According to an embodiment of the present invention, the MPDU soliciting an immediate response of the Ack context may follow an MPDU delimiter with the value of the EOF field equal to 1 and the value of the MPDU length field not equal to 0.

When the response is transmitted with the M-BA frame, the response may be performed through the per AID TID information field which is independent for each TID. In this case, in the response to the Action frame, the TID value of the per AID TID information field is set to '1111'. If an MPDU of the Ack context is present in the received A-MPDU, the value of the Ack type subfield of the per AID TID information field corresponding to the MPDU may be set to 1 so that the BA bitmap is omitted. Also, if all the MPDUs contained in the received A-MPDU are successfully received, the STA may perform a response of the All Ack context by inserting only one per AID TID information field in the M-BA frame. In this case, the TID value of only one per AID TID information field inserted in the M-BA frame may be set to '1110' to indicate the response of the All Ack context.

Figure 12:
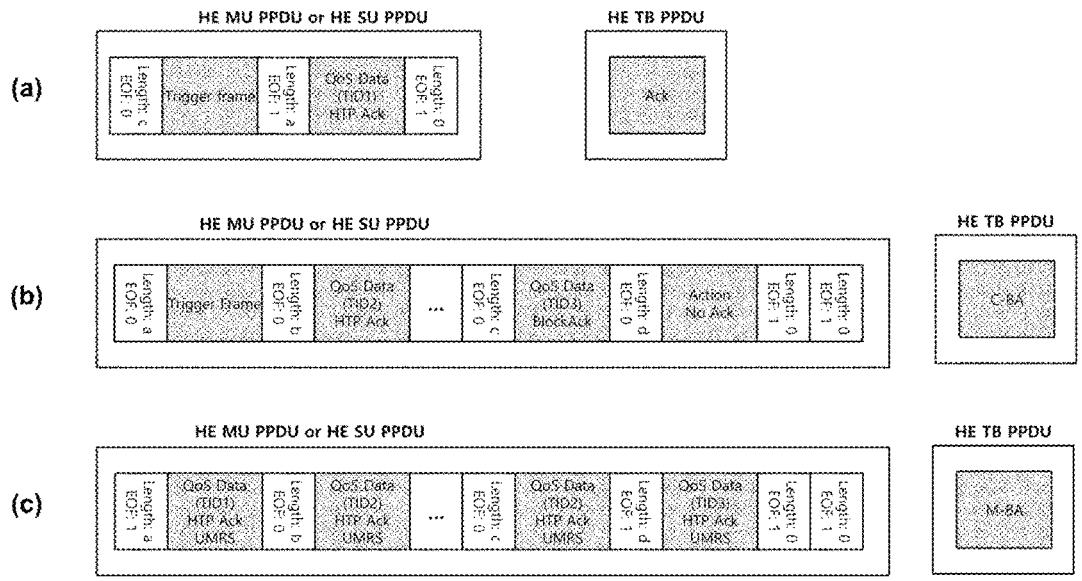
FIG. 12 illustrates another embodiment of a method that a terminal transmits a response frame for an A-MPDU.

FIG. 12 illustrates another embodiment of a method that a terminal transmits a response frame for an A-MPDU. In the embodiment of FIG. 12, the same or corresponding parts as those of the embodiment of FIG. 11 described above will be omitted.

FIG. 12 illustrates embodiments of a response method of a STA when an MPDU with the acknowledgment policy set to HTP Ack is present in the received A-MPDU. The A-MPDU transmitted by the AP may be carried via a high efficiency single-user (HE SU) PPDU or a high efficiency multi-user (HE MU) PPDU, and the STA receives the PPDU. If the acknowledgment policy of the MPDU contained in the received A-MPDU is set to HTP Ack, the recipient should perform a response in HE-TB PPDU format. In this case, the STA receiving the MPDU with the acknowledgment policy set to HTP Ack may respond in HE TB PPDU format only if one of the following conditions is satisfied. i) When an A-MPDU containing a trigger frame in which the receiver address field is set to the address of the STA is received. ii) When an A-MPDU containing a QoS data frame or a QoS null frame in which an uplink multi-user response scheduling (UMRS) control field is included and the receiver address field is set to the address of the STA is received. If at least one of the trigger frame and the UMRS control field is not received, the STA cannot respond to the MPDU for which the acknowledgment policy is set to HTP Ack. The STA may respond with either an Ack frame, a BlockAck frame, or an M-BA frame carried in the HE-TB PPDU based on the format of the received A-MPDU.

First, FIG. 12(a) illustrates an embodiment in which the STA responds to an A-MPDU with an Ack frame carried in a HE-TB PPDU. According to the embodiment of the present invention, if the MPDU successfully received in the A-MPDU is the only MPDU soliciting an immediate response of the Ack context (i.e., the received A-MPDU is identified as the S-MPDU) and contains a UMRS control field, the STA responds with the Ack frame. Also, if the MPDU(s) successfully received in the A-MPDU include only one MPDU soliciting an immediate response of the Ack context, zero or more other MPDUs not soliciting an immediate response, and the trigger frame, the STA responds with the Ack frame. That is, if the MPDU(s) successfully received in the A-MPDU include only one MPDU soliciting an immediate response, and contains a UMRS control field or a trigger frame, the STA responds with the Ack frame.

In this case, the MPDU soliciting an immediate response of the Ack context may include an Action frame, a QoS data frame in which the acknowledgment policy is HTP Ack, a QoS Null frame in which the acknowledgment policy is HTP Ack, and the like. According to an embodiment of the present invention, the MPDU soliciting an immediate response of the Ack context may follow an MPDU delimiter with the value of the EOF field equal to 1 and the value of the MPDU length field not equal to 0. Further, the MPDU not soliciting an immediate response may include an Action No Ack frame, a QoS data frame in which the acknowledgment policy is BlockAck or No Ack, a QoS Null frame in which the acknowledgment policy is BlockAck or No Ack, and the like.

According to a further embodiment of the present invention, the STA may respond with an M-BA frame if the received A-MPDU is identified as containing only one MPDU soliciting an immediate response of the Ack context. In this case, the STA may insert only one per AID TID information field in the M-BA frame to perform the response of the Ack context. However, since the length of the M-BA frame is longer than the length of the Ack frame, the STA may response with the M-BA frame only when transmission is possible using a modulation and coding scheme (MCS) according to a specified rule within a length indicated by the trigger information contained in the received MPDU. In this case, the length indicated by the trigger information may be represented through a length field of the common information field of the trigger frame or an HE TB PPDU length field of the UMRS control field of the MPDU.

Next, FIG. 12(b) illustrates an embodiment in which the STA responds to an A-MPDU with a compressed BlockAck (C-BA) frame carried in an HE TB PPDU. According to the embodiment of the present invention, when the received A-MPDU is identified as a single-TID A-MPDU, the STA responds with a compressed BlockAck (C-BA) frame. That is, if the MPDU(s) successfully received in the A-MPDU include a plurality of MPDUs of only one TID soliciting an immediate response of the BlockAck context, and contains a UMRS control field or a trigger frame, the STA responds with the C-BA frame. Also, if the MPDU(s) successfully received in the A-MPDU include a plurality of MPDUs of only one TID soliciting an immediate response of the BlockAck context and one or more other MPDUs not soliciting an immediate response, and contains a UMRS control field or a trigger frame, the STA responds with the C-BA frame. In other words, if all of the MPDUs soliciting an immediate response of the BlockAck context among the successfully received MPDU(s) of the A-MPDU belong to the same TID and the A-MPDU contains a UMRS control field or a trigger frame, the STA responds with the C-BA frame.

In this case, the MPDU soliciting an immediate response of the BlockAck context may include a QoS data frame in which the acknowledgment policy is HTP Ack, a QoS Null frame in which the acknowledgment policy is HTP Ack, and the like. According to an embodiment, the MPDU soliciting an immediate response of the BlockAck context may follow an MPDU delimiter with the value of the EOF field equal to 0 and the value of the MPDU length field not equal to 0. Further, the MPDU not soliciting an immediate response may include an Action No Ack frame, a QoS data frame in which the acknowledgment policy is BlockAck or No Ack, a QoS Null frame in which the acknowledgment policy is BlockAck or No Ack, and the like. According to a further embodiment of the present invention, the STA may respond with an M-BA frame if the received A-MPDU is identified as a single-TID A-MPDU.

Next, FIG. 12(c) illustrates an embodiment in which the STA responds to an A-MPDU with a multi-STA BlockAck (M-BA) frame carried in an HE TB PPDU.

According to the embodiment of the present invention, when the received A-MPDU is identified as a multi-TID A-MPDU, the STA responds with a multi-STA BlockAck (M-BA) frame. That is, if the MPDU(s) successfully received in the A-MPDU include MPDUs of two or more TIDs soliciting an immediate response, and contains a UMRS control field or a trigger frame, the STA responds with the M-BA frame. Also, if the MPDU(s) successfully received in the A-MPDU include MPDUs of one or more TIDs soliciting an immediate response and an Action frame, and contains a UMRS control field or a trigger frame, the STA responds with the M-BA frame.

According to a further specific embodiment, the STA may respond with the M-BA frame if the received A-MPDU contains a UMRS control field or a trigger frame, satisfying at least one of the following conditions: i) The A-MPDU contains MPDUs of two or more TIDs soliciting an immediate response of the BlockAck context. ii) The A-MPDU contains MPDUs of one or more TIDs soliciting an immediate response of the BlockAck context and MPDUs of one or more TIDs soliciting an immediate response of the Ack context. iii) The A-MPDU contains MPDUs of two or more TIDs soliciting an immediate response of the Ack context. iv) The A-MPDU contains MPDUs of one or more TIDs soliciting an immediate response of the BlockAck context or Ack context and an Action frame.

In this case, the MPDU soliciting an immediate response of the BlockAck context may include a QoS data frame in which the acknowledgment policy is HTP Ack, a QoS Null frame in which the acknowledgment policy is HTP Ack, and the like. According to an embodiment, the MPDU soliciting an immediate response of the BlockAck context may follow an MPDU delimiter with the value of the EOF field equal to 0 and the value of the MPDU length field not equal to 0. Further, the MPDU soliciting an immediate response of the Ack context may include an Action frame, a QoS data frame in which the acknowledgment policy is HTP Ack, a QoS Null frame in which the acknowledgment policy is HTP Ack, and the like. According to an embodiment of the present invention, an MPDU soliciting an immediate response of the Ack context may follow an MPDU delimiter with the value of the EOF field equal to 1 and the value of the MPDU length field not equal to 0.

When the response is transmitted with the M-BA frame, the response may be performed through the per AID TID information field which is independent for each TID. A specific embodiment thereof is as described in the embodiment of FIG. 11(c).

Figure 13:
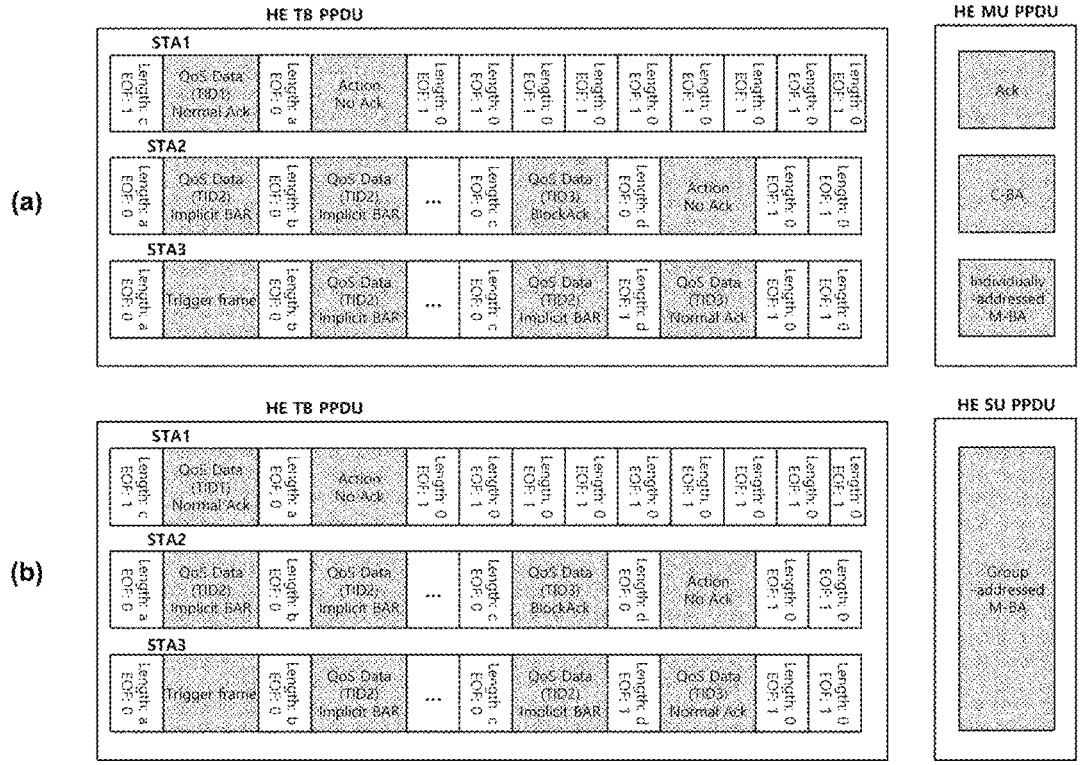
FIG. 13 illustrates an embodiment of a method that an AP transmits a response frame for an A-MPDU.

FIG. 13 illustrates an embodiment of a method that an AP transmits a response frame for an A-MPDU. In a non-legacy wireless LAN system, an AP may receive PPDUs transmitted by one or more STAs through an uplink multi-user (UL MU) transmission. Accordingly, the format of a response frame and the format of a PPDU carrying the response frame may be determined according to the A-MPDU configuration of the PPDU received by the AP from the one or more STAs.

First, FIG. 13(a) illustrates an embodiment in which the AP receives an A-MPDU transmitted by one or more STAs and responds with a response frame carried in an HE MU PPDU. The AP receives A-MPDUs transmitted by one or more STAs and constructs a response frame for each STA according to the above-described embodiment. When a plurality of A-MPDUs of the received A-MPDUs solicit an immediate response, the AP may perform a response in HE MU PPDU format. The AP may generate a response frame of either Ack frame, BlockAck frame or M-BA frame for each received A-MPDU, and transmit the generated multiple response frames in HE MU PPDU format. A specific embodiment for determining the format of the response frame for each received A-MPDU is as described above in FIG. 11. The AP may transmit the response frame through a resource unit assigned to each STA. According to an embodiment of the present invention, each response frame carried in the HE MU PPDU may be transmitted via the resource unit on which the A-MPDU of each STA is transmitted.

Next, FIG. 13(b) illustrates an embodiment in which the AP receives an A-MPDU transmitted by one or more STAs and responds with a response frame carried in an HE SU PPDU. When an HE SU PPDU transmitted by one STA is received or only one A-MPDU among A-MPDUs transmitted by a plurality of STAs solicits an immediate response, the AP may perform a response in HE SU PPDU format. The AP may generate a response frame of either Ack frame, BlockAck frame, or M-BA frame for the A-MPDU requiring an immediate response, and transmit the generated response frame in HE SU PPDU format. A specific embodiment for determining the format of the response frame for the received A-MPDU is as described above in FIG. 11.

According to a further embodiment of the present invention, when a plurality of A-MPDUs of the received A-MPDUs solicit an immediate response, the AP may also perform a response in HE SU PPDU format. In this case, the response frame carried in the HE SU PPDU may be a group-addressed M-BA frame. The group-addressed M-BA frame may represent response information for each STA and each TID through the per AID TID information field.

Figure 14:
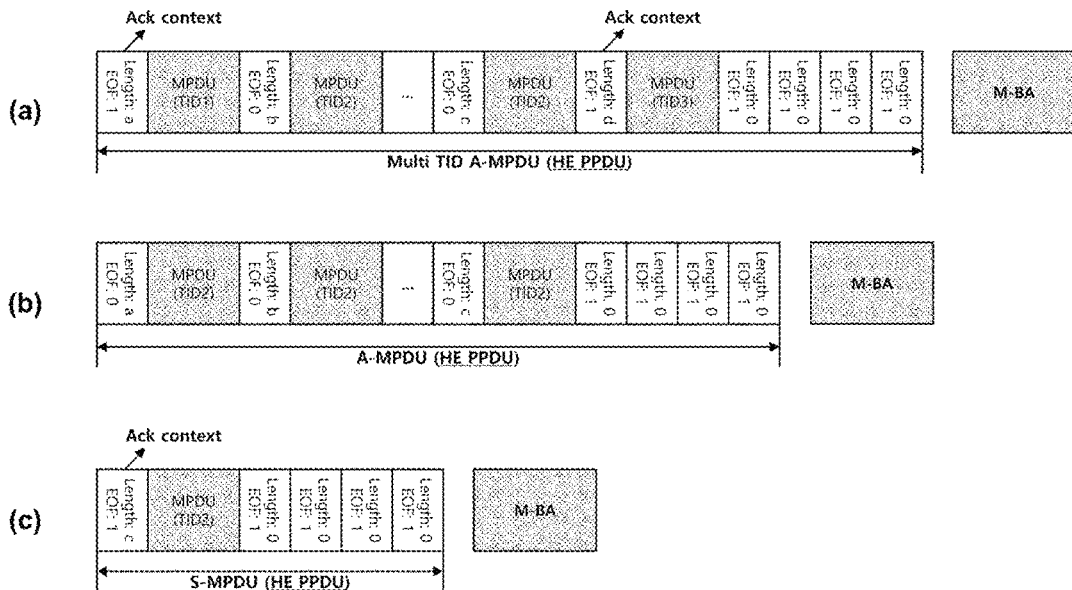
FIG. 14 illustrates a method of transmitting a response frame according to another embodiment of the present invention.

FIG. 14 illustrates a method of transmitting a response frame according to another embodiment of the present invention. According to the embodiment of FIG. 14, a response may be performed with an M-BA frame for A-MPDU and S-MPDU of all formats soliciting an immediate response carried in an HE PPDU. In other words, the terminal may consistently respond with an M-BA frame for the multi-TID A-MPDU illustrated in FIG. 14(a), the single-TID A-MPDU illustrated in FIG. 14(b), and the S-MPDU illustrated in FIG. 14(c). When the terminal consistently responds with an M-BA frame, the implementation is simple and it is possible to eliminate the possibility that the transmitter receives a response frame in an unexpected format. However, if it is clear that an S-MPDU has been transmitted, there is a disadvantage that a response should be performed with an M-BA frame having a larger amount of data than the Ack frame.

Operation Method in Reception Failure of Some MPDUs in an A-MPDU

FIGS. 15 to 19 illustrate a method of operation of a terminal when a transmission of at least some MPDUs in an A-MPDU has failed. In the embodiments of FIGS. 15 to 19, the same or corresponding parts as those of the embodiments of the previous drawings will be omitted.

As in the embodiments described above, the terminal may generate an A-MPDU containing one or more MPDU(s) soliciting an immediate response, and may transmit the generated A-MPDU. The recipient of the A-MPDU determines the format of the response frame based on the number of TIDs soliciting an immediate response in the successfully received MPDU(s) and transmits the response frame in the determined format. That is, the response frame for the A-MPDU may be generated based on the number of TIDs soliciting an immediate response in the MPDU(s) successfully received by the recipient. According to an embodiment, an Action frame included in the successfully received MPDU(s) may be considered as an individual TID. The terminal receives a response frame of the recipient corresponding to the A-MPDU, and determines whether the transmission of the MPDU(s) contained in the A-MPDU is successful based on the received response frame. When a response frame of an expected format is received for the A-MPDU transmitted by the terminal according to the above-described embodiment, the terminal may determine whether or not each MPDU is successfully transmitted based on the response information for each MPDU contained in the response frame.

Meanwhile, the recipient may fail to receive at least some MPDUs of the transmitted A-MPDU depending on the communication status. If the reception of at least some MPDUs has failed, the recipient may not be able to determine which of the S-MPDU, the single-TID A-MPDU and the multi-TID A-MPDU has been received. In particular, in uplink/downlink (UL/DL) OFDMA PPDUs used in the non-legacy wireless LAN system, a large amount of EOF padding may be included to align the length of PPDUs. This may cause a situation more frequently where the recipient cannot successfully receive at least part of the received data and cannot determine the configuration of the A-MPDU. Therefore, subsequent operation methods of the communication terminals should be defined in the above situation of reception failure of some MPDUs.

According to the embodiment of the present invention, the terminal may determine whether the transmission of the MPDU(s) contained in the A-MPDU is successful by comparing the format of the response frame expected for the transmitted A-MPDU and the format of the response frame that is actually transmitted from the recipient. As in the above-described embodiments, the format of the response frame expected for the A-MPDU may be determined based on, in the one or more MPDU(s) constituting the A-MPDU, at least one of the number of TIDs soliciting an immediate response or the MPDU delimiter information. Accordingly, the terminal may determine success or failure of MPDU(s) contained in the A-MPDU by considering, in the one or more MPDU(s) constituting the A-MPDU, at least one of the number of TIDs soliciting an immediate response or the MPDU delimiter information, and considering the response frame transmitted corresponding to the A-MPDU.

Figure 15:
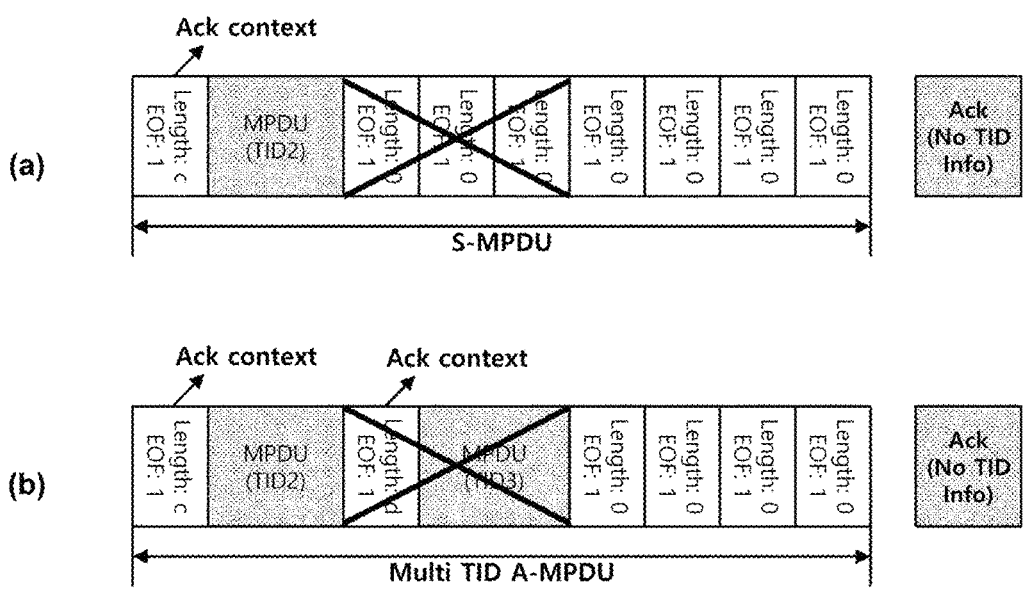
FIG. 15 illustrates a method of transmitting an A-MPDU and a response frame according to an embodiment of the present invention.

FIG. 15 illustrates a method of transmitting an A-MPDU and a response frame according to an embodiment of the present invention. FIG. 15(a) illustrates an embodiment in which the terminal transmits an S-MPDU and the recipient fails to receive some EOF padding portion contained in the S-MPDU. Further, FIG. 15(b) illustrates an embodiment in which the terminal transmits a multi-TID A-MPDU and the recipient fails to receive an MPDU of some TID (i.e., TID3).

Referring to FIG. 15(a), the recipient receives an S-MPDU transmitted by the terminal and transmits an Ack frame in response thereto. Since the response to the S-MPDU is expected to be an Ack frame, the terminal may determine that the transmission of the S-MPDU is successful.

On the other hand, referring to FIG. 15(b), the recipient successfully receives only some MPDUs of the multi-TID A-MPDUs transmitted by the terminal. More specifically, although the A-MPDU transmitted by the terminal contains MPDUs of two different TIDs (i.e., TID2 and TID3) soliciting an immediate response of the Ack context, the recipient successfully receives only one of the MPDUs. Here, the MPDU soliciting an immediate response of the Ack context may follow an MPDU delimiter with the value of the EOF field equal to 1 and the value of the MPDU length field not equal to 0. That is, the MPDU (and MPDU delimiter) of the specific TID (i.e., TID2) in the multi-TID A-MPDU is successfully received, but the MPDU (and MPDU delimiter) of the other TID (i.e., TID3) is not successfully received. In the embodiment of 15(b), since the recipient successfully receives only one MPDU soliciting an immediate response of the Ack context among the multi-TID A-MPDU transmitted by the terminal, it may determine that an S-MPDU has been received. Therefore, the recipient responds with an Ack frame to the multi-TID A-MPDU.

The terminal receives the Ack frame transmitted as a response. However, since the Ack frame does not include a block Ack information field or a TID information field indicating the TID of the response information, the terminal cannot determine which MPDU the received Ack frame is for. Therefore, according to the embodiment of the present invention, when the terminal that has transmitted a multi-TID A-MPDU receives a response of the Ack frame, the terminal determines that the transmission of the multi-TID A-MPDU has failed. In other words, when the transmitted A-MPDU consists of MPDUs of a plurality of TIDs soliciting an immediate response and a response frame transmitted corresponding to the A-MPDU is an Ack frame, it is determined that the transmission of MPDU(s) contained in the A-MPDU has failed. Therefore, the terminal may retransmit the MPDU(s) contained in the A-MPDU of which the transmission is determined to have failed.

However, according to the embodiment of the present invention, apart from the determination that the transmission of the MPDU(s) contained in the A-MPDU has failed, since a response of an Ack frame to the A-MPDU is received, the terminal may determine that the channel access for the transmission of the A-MPDU is successful. Thus, the terminal may reset at least one of EDCA parameters of the access category used for the channel access for the A-MPDU transmission. In this case, the EDCA parameter may include a contention window, a QoS short retry counter (QSRC), a QoS long retry counter (QLRC), and the like.

Figure 16:
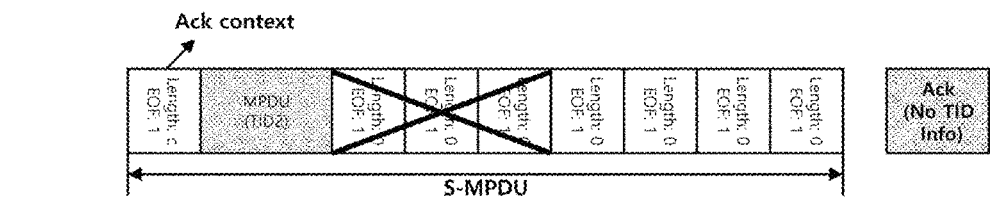
FIG. 16 illustrates a method of transmitting an A-MPDU and a response frame according to another embodiment of the present invention.
Figure 16:
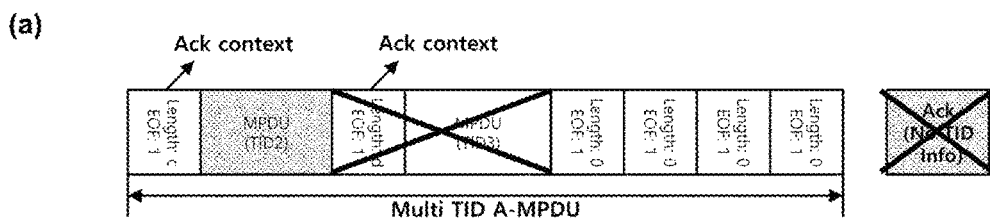
Figure 16:
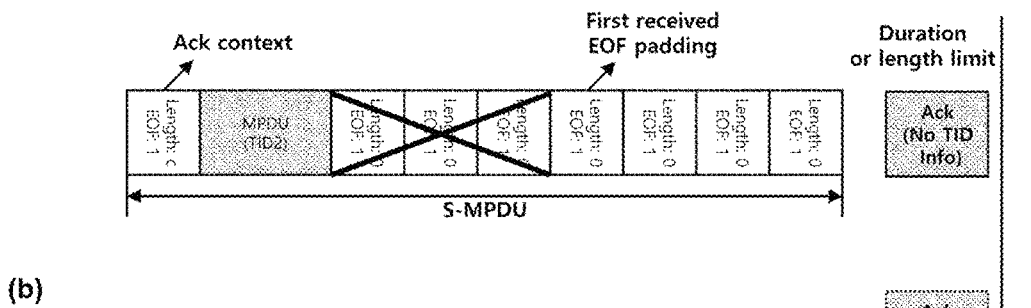
Figure 16:
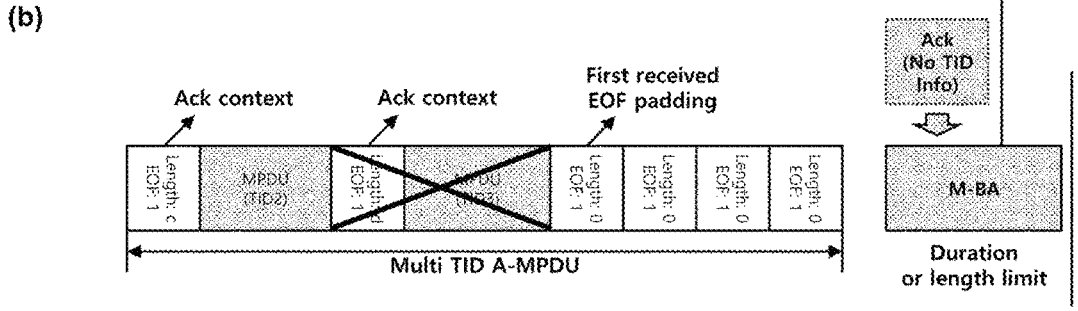

FIG. 16 illustrates a method of transmitting an A-MPDU and a response frame according to another embodiment of the present invention. More specifically, FIG. 16(a) illustrates a transmission method of a response frame for an A-MPDU according to the above-described embodiments, FIG. 16(b) illustrates a transmission method of a response frame for an A-MPDU according to a further embodiment of the present invention.

According to the embodiment of FIG. 16(a), if the recipient successfully receives only one MPDU soliciting an immediate response of the Ack context among the multi-TID A-MPDU transmitted by the terminal, the recipient responds with an Ack frame. However, since the Ack frame does not include the block Ack information field or the TID information field indicating the TID of the response information, the terminal cannot determine which MPDU the received Ack frame is for.

Therefore, according to the embodiment of FIG. 16(b), the recipient may determine the format of the response frame based on the reception state of each MPDU of the A-MPDU. As described above, each MPDU follows an MPDU delimiter in an A-MPDU, and the MPDU delimiter indicates length information of the MPDU. Since each MPDU delimiter indicates the length information of the MPDU, the recipient may determine whether or not each MPDU and MPDU delimiter contained in the A-MPDU are successfully received. If the recipient has successfully received only one MPDU soliciting an immediate response and has not successfully receive at least some MPDUs, there is a possibility that another data soliciting an immediate response was present in the MPDU that was not successfully received.

According to the embodiment of the present invention, if there is a possibility that an MPDU that is not successfully received is an MPDU soliciting an immediate response, the recipient may respond with an M-BA frame. For example, if at least one MPDU or MPDU delimiter in an A-MPDU is not successfully received, the recipient may respond with an M-BA frame. More specifically, if at least one MPDU or MPDU delimiter is not successfully received prior to the first received EOF padding in the A-MPDU, the MPDU that is not successfully received may be an MPDU soliciting an immediate response. Thus, the recipient may respond with an M-BA frame. That is, even if only one MPDU soliciting an immediate response of the Ack context is successfully received, if at least one MPDU or MPDU delimiter is not successfully received prior to the first received EOF padding in the A-MPDU, the recipient responds with an M-BA frame instead of an Ack frame. In this case, in the per AID TID information field of the M-BA frame, the value of the TID subfield may be set to the TID of the successfully received MPDU, and the value of the Ack type subfield may be set to 1 so that the BA bitmap is omitted. That is, if an A-MPDU presumed to be an S-MPDU is received and it is identified as an incomplete A-MPDU, the recipient may respond with an M-BA frame instead of an Ack frame.

On the other hand, if there is a portion that was not successfully received only after the first received EOF padding in the A-MPDU, the portion that was not successfully received may be another EOF padding. Thus, the response of the recipient may not be forced into the M-BA frame. In addition, since the above-described problem occurs only when an error occurs in the received A-MPDU and the recipient responds with an Ack frame, the response may not be forced into the M-BA frame in a situation where the recipient should respond with a C-BA frame.

According to an embodiment of the present invention, the recipient may respond with an M-BA frame only when it can transmit the M-BA frame within a duration indicated by a successfully received MPDU or a length indicated by a trigger frame received in an A-MPDU. In this case, the recipient may respond with the M-BA frame only when it is possible to transmit the M-BA frame within the duration or length using an MCS according to the specified rule.

According to another embodiment of the present invention, if an A-MPDU presumed to be an S-MPDU is received and at least a part of the A-MPDU is not successfully received, the recipient may regard the A-MPDU as a multi-TID A-MPDU. Since the response to the multi-TID A-MPDU is performed via an M-BA frame, the recipient may respond with an M-BA frame to the A-MPDU.

According to a further embodiment of the present invention, the use of the M-BA frame as a response to the HE PPDU may be extended. In the non-legacy wireless LAN system, the M-BA frame is able to respond to the A-MPDU of the most various configurations and is able to change its form so that an efficient response can be performed. Thus, according to a further embodiment of the present invention, the M-BA frame may be used universally as a response frame except for a situation that an Ack frame is sent as a response. For example, the non-legacy wireless LAN terminal may respond with the M-BA frame if at least some MPDUs of the A-MPDU are not successfully received and one or more successfully received MPDUs solicit an immediate response. Alternatively, if the at least some MPDUs of the A-MPDU are not successfully received and one or more successfully received MPDUs solicit an immediate response, the non-legacy wireless LAN terminal may regard the A-MPDU as a multi-TID A-MPDU. Accordingly, the non-legacy wireless LAN terminal responds with an M-BA frame according to the response procedure for a multi-TID A-MPDU.

Figure 17:
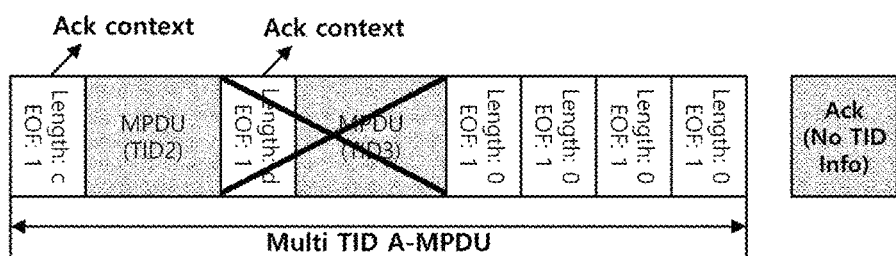
FIG. 17 illustrates a method of transmitting an A-MPDU and a response frame according to yet another embodiment of the present invention.

FIG. 17 illustrates a method of transmitting an A-MPDU and a response frame according to yet another embodiment of the present invention. According to the embodiment of FIG. 17, a response frame transmission method which does not change the operation of the conventional receiving terminal may be used in order to reduce the complexity of the implementation.

More specifically, when a terminal that has transmitted an A-MPDU consisting of MPDUs of a plurality of TIDs soliciting an immediate response receives a response of an Ack frame, the terminal may ignore the response of the Ack frame. Therefore, the terminal should retransmit all the MPDUs constituting the A-MPDU. However, since the terminal has received the response frame for the transmitted A-MPDU, it may determine that the transmission of the A-MPDU has not failed. According to an embodiment of the present invention, the terminal may regard the enhanced distributed channel access function (EDCAF) of the access category used for the channel access in the transmission of the previous A-MPDU as not failed. Accordingly, the terminal may resume the backoff operation while maintaining the EDCA parameters such as a contention window of the access category, a QoS short retry counter (QSRC), and a QoS long retry counter (QLRC) as the previous values. According to another embodiment of the present invention, since the response of the Ack frame for the A-MPDU has been received, the terminal may determine that the channel access (i.e., EDCAF) for the A-MPDU transmission is successful. Thus, the terminal may reset at least one EDCA parameter of the access category used for the channel access for the A-MPDU transmission.

Figure 18:
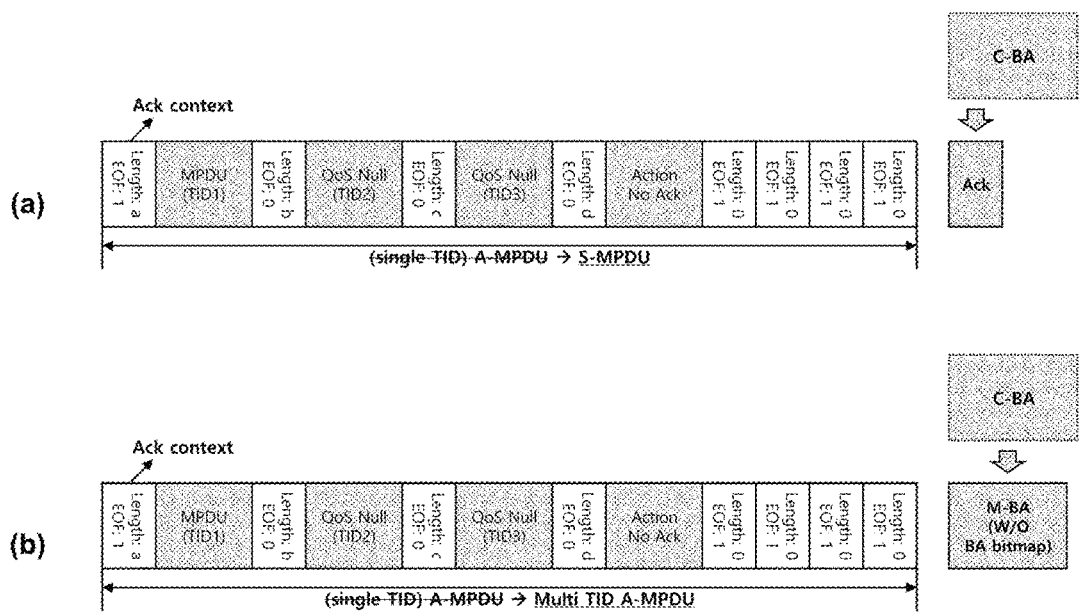
FIG. 18 illustrates a method of transmitting an S-MPDU and a response frame in the non-legacy wireless LAN system according to an embodiment of the present invention.
Figure 19:
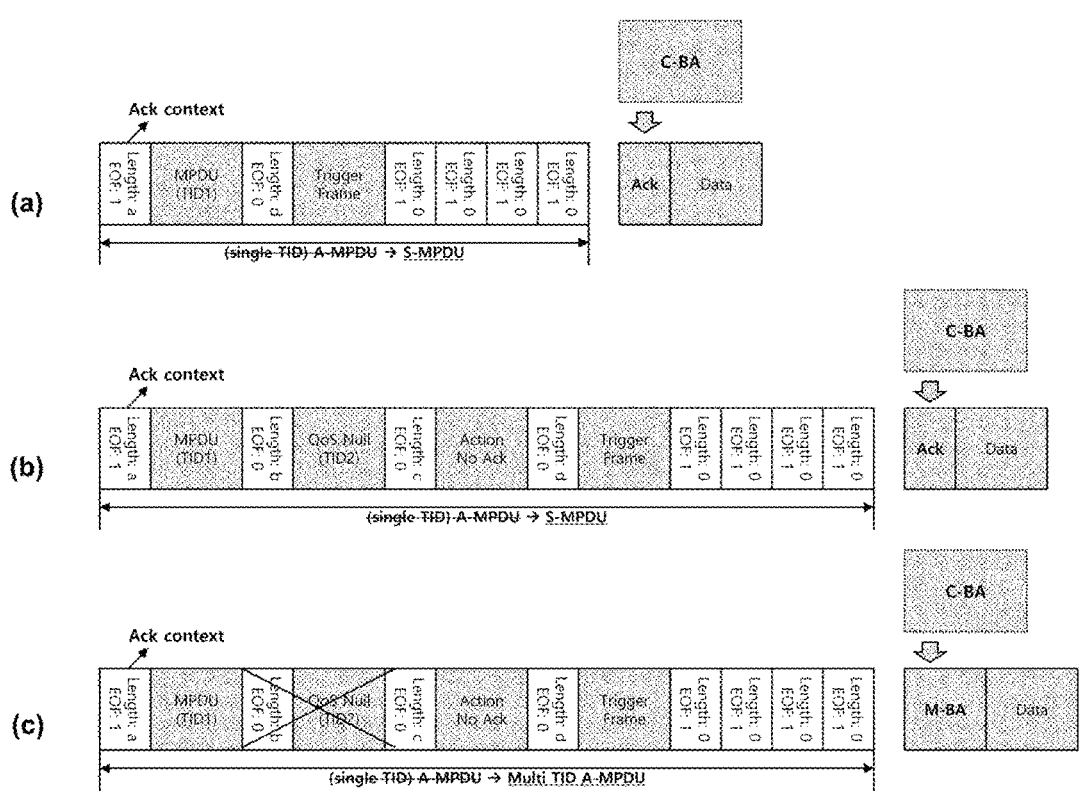
FIG. 19 illustrates a method of transmitting an S-MPDU and a response frame in the non-legacy wireless LAN system according to another embodiment of the present invention.

Additional Embodiments of a Method of Transmitting an S-MPDU and a Response Frame FIGS. 18 and 19 illustrate a method of transmitting an S-MPDU and a response frame in the non-legacy wireless LAN system according to a further embodiment of the present invention.

FIG. 18 illustrates a method of transmitting an S-MPDU and a response frame in the non-legacy wireless LAN system according to an embodiment of the present invention. As described above, the configuration of the multi-TID A-MPDU was not allowed in the legacy wireless LAN system. Further, since the A-MPDU subframe in which the value of the EOF field is set to 1 can be present only one for each TID in the A-MPDU, it was obvious that the A-MPDU subframe in which the value of the EOF field is set to 1 is the only A-MPDU subframe within the A-MPDU. Thus, the recipient could respond with an Ack frame, with the exception of other possibilities.

However, the configuration of the multi-TID A-MPDU is allowed in the non-legacy wireless LAN system. Therefore, in addition to the MPDU soliciting an immediate response of the Ack context, an MPDU of another TID soliciting an immediate response of the Ack context, a plurality of MPDUs in which the value of the EOF field is set to 0, an Action frame, a QoS data/Null frame, an Action No Ack frame, and the like are allowed to be aggregated and transmitted.

In the legacy wireless LAN system, if the received A-MPDU contains only one MPDU and the MPDU solicits an immediate response of the Ack context, the A-MPDU can be classified into an S-MPDU. Thus, the recipient could respond with an Ack frame. However, in the non-legacy wireless LAN system, even if the received A-MPDU contains only one MPDU soliciting an immediate response, it may be classified into an A-MPDU rather than an S-MPDU when it is aggregated with one or more other MPDUs not soliciting an immediate response. In this case, the MPDU not soliciting an immediate response may include an Action No Ack frame, a QoS data frame in which the acknowledgment policy is BlockAck or No Ack, a QoS Null frame in which the acknowledgment policy is BlockAck or No Ack, a control response (e.g., Ack, BlockAck), and the like. Therefore, in the above situation, the recipient cannot respond with the Ack frame. In addition, since the recipient should respond with a C-BA frame when the A-MPDU is regarded as a single-TID A-MPDU, it is impossible to omit the BA bitmap through the setting of the Ack type subfield, which may be inefficient.

Thus, according to an embodiment of the present invention illustrated in FIG. 18(a), when the received A-MPDU contains MPDU soliciting an immediate response of the Ack context only one, the recipient may regard the A-MPDU as an S-MPDU even if one or more other MPDUs not soliciting an immediate response are aggregated together. Thus, the recipient responds with an Ack frame.

According to another embodiment of the present invention illustrated in FIG. 18(b), when the received A-MPDU contains only one MPDU soliciting an immediate response of the Ack context and one or more other MPDUs not soliciting an immediate response, the STA may regard the A-MPDU as a multi-TID A-MPDU. Thus, the recipient responds with an M-BA frame. However, the value of the Ack type subfield of the per AID TID information field corresponding to the MPDU soliciting an immediate response may be set to 1 so that the BA bitmap is omitted.

FIG. 19 illustrates a method of transmitting an S-MPDU and a response frame in the non-legacy wireless LAN system according to another embodiment of the present invention. If the A-MPDU is carried in a downlink HE MU PPDU, in order to make the recipient to respond, the trigger information should be transmitted together with the exception of MPDUs in which the acknowledgment policy is general Ack. In this case, the trigger information may be transmitted through a trigger frame or a UMRS control field included in the MAC header. However, a terminal which cannot receive the UMRS control field may respond only when receiving an MPDU soliciting an immediate response of the Ack context together with the trigger frame.

Therefore, according to an embodiment of the present invention, when the received A-MPDU contains MPDU soliciting an immediate response of the Ack context only one, the recipient may regard the A-MPDU as an S-MPDU even if the trigger frame is aggregated together. Thus, the recipient responds with an Ack frame.

More specifically, referring to FIG. 19(a), when the received A-MPDU contains only one MPDU soliciting an immediate response of the Ack context and a trigger frame, the STA may regard the A-MPDU as an S-MPDU. Further, referring to FIG. 19(b), even if the received A-MPDU contains only one MPDU soliciting an immediate response of the Ack context, one or more other MPDUs not soliciting an immediate response, and a trigger frame, the STA may regard the A-MPDU as an S-MPDU. Therefore, the recipient responds with an Ack frame to the received A-MPDU.

According to another embodiment of the present invention illustrated in FIG. 19(c), in the situation illustrated in FIG. 19(a) or 19(b), the recipient may regard the A-MPDU as a multi-STA A-MPDU. Thus, the recipient responds with an M-BA frame. However, the value of the Ack type subfield of the per AID TID information field corresponding to the MPDU soliciting an immediate response may be set to 1 so that the BA bitmap is omitted.

TID Aggregation Limit

The AP may use the trigger information to indicate the maximum number of TIDs that can be aggregated in the A-MPDU to be transmitted by each wireless communication terminal. In this case, the trigger information may be transmitted through at least one of the trigger frame and the UMRS control field included in the MAC header. Referring to FIGS. 20 to 24, an operation of the AP to indicate the maximum number of TIDs that can be aggregated in the A-MPDU to be transmitted by each wireless communication terminal by using the trigger frame will be described.

Figure 20:
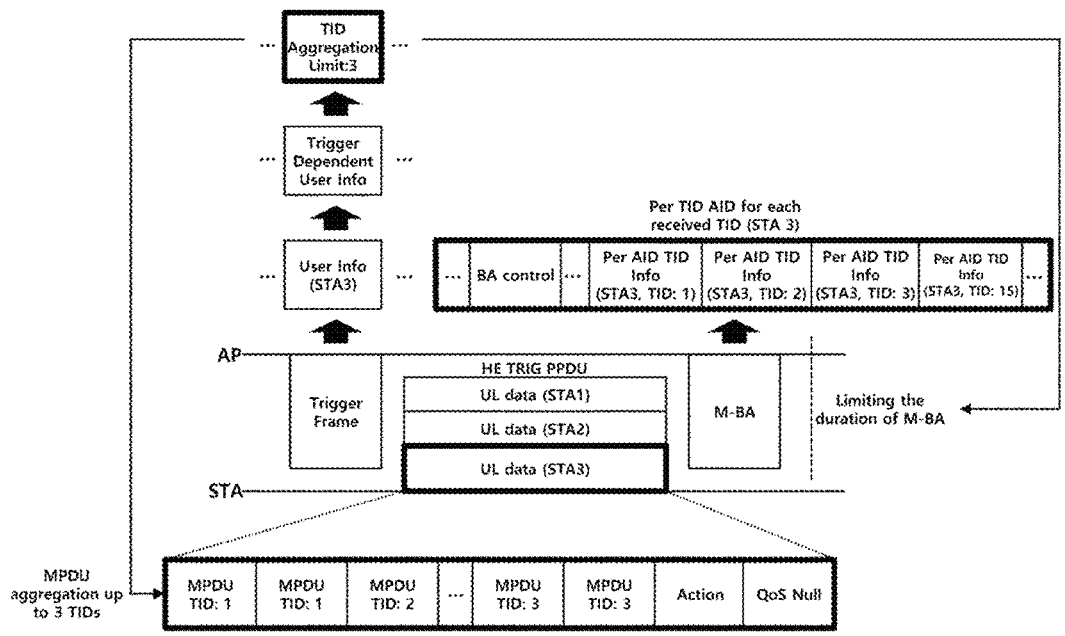
FIG. 20 illustrates an operation of a wireless communication terminal according to an embodiment of the present invention to transmit an A-MPDU based on the maximum number of TIDs information.

FIG. 20 illustrates an operation of a wireless communication terminal according to an embodiment of the present invention to transmit an A-MPDU based on the maximum number of TIDs information.

The AP may use the trigger frame to indicate information on the type of an MPDU included in the A-MPDU to be transmitted to the AP by the wireless communication terminal. As described above, the AP may use the trigger frame to indicate the maximum number of TIDs that the A-MPDU that the wireless communication terminal transmits to the AP is capable of having. Specifically, the AP may use the User Info field of the trigger frame to indicate the maximum TID to be transmitted by the wireless communication terminal corresponding to the User Info field. In a specific embodiment, the AP may use the TID Aggregation Limit of the User Info field of the trigger frame to indicate the maximum TID to be transmitted by the wireless communication terminal corresponding to the User Info field. At this time, the wireless communication terminal receiving the trigger frame may set the number of TIDs that the A-MPDU is capable of having based on the trigger frame. Specifically, the wireless communication terminal receiving the trigger frame may set the number of TIDs of the MPDU included in the A-MPDU to transmit based on the maximum number of TIDs indicated by the trigger frame, and transmit the A-MPDU to the AP. For example, the wireless communication terminal receiving the trigger frame may set the number of TIDs of the MPDU included in the A-MPDU to transmit, which does not exceed the maximum number of TIDs indicated by the trigger frame, and transmit the A-MPDU to the AP. Through this, the AP may efficiently manage the scoreboard. In addition, BA bitmap lengths for each of a plurality of wireless communication terminals may be adjusted.

In a specific embodiment, the value of the TID Aggregation Limit field may indicate the maximum number of TIDs that the A-MPDU that the wireless communication terminal receiving the trigger frame transmits to the AP is capable of having. For example, when the TID Aggregation Limit field is a 3-bit field and has a value from 0 to 7, each of the values 0 to 7 may indicate that the maximum number of TIDs of the A-MPDU to be transmitted to the AP corresponds to any one of 1 to 8.

In another specific embodiment, the AP may use the trigger frame to indicate that the wireless communication terminal indicated in the trigger frame is not allowed to generate the A-MPDU to be transmitted to the AP by aggregating the MPDU having the TID. Specifically, the AP may set the TID Aggregation Limit to 0 to indicate that the wireless communication terminal indicated in the trigger frame is not allowed to generate the A-MPDU to be transmitted to the AP by aggregating the MPDU having the TID. However, when the A-MPDU includes an MPDU soliciting an immediate response even when the MPDU does not have a TID, the size of the BA frame transmitted by the recipient in response to the A-MPDU may be increased. Also, the burden of managing the scoreboard of the recipient may be increased. At this time, an immediate response may indicate that the recipient transmits a response to the originator within a predetermined time period in the same Transmission Opportunity (TXOP). Specifically, the predetermined period may be a Short Inter-Frame Space (SIFS).

In another specific embodiment, the AP may use the trigger frame to indicate that the wireless communication terminal indicated by the trigger frame is not allowed to generate the A-MPDU to be transmitted to the AP by aggregating the MPDUs that solicit an immediate response. At this time, the MPDU soliciting an immediate response may include an MPDU including Quality of Service (QoS) data having a TID. In addition, an MPDU soliciting an immediate response may include a Management MPDU (MMPDU) soliciting an immediate response. Specifically, an MPDU soliciting an immediate response may include an Action frame. The AP sets the value of the TID Aggregation Limit field of the User Info field of the trigger frame to 0 to indicate that the wireless communication terminal corresponding to the User Info field is not allowed to generate the A-MPDU to be transmitted to the AP by aggregating MPDUs that solicit an immediate response. When the TID Aggregation Limit field value indicates a value other than 0, it may indicate the maximum number of TIDs that the A-MPDU to be transmitted by the wireless communication terminal indicated by the trigger frame to the AP may have. Also, when the trigger frame indicates that the wireless communication terminal is not allowed to generate an A-MPDU to be transmitted to the AP by aggregating MPDUs that solicit an immediate response, the wireless communication terminal may generate an A-MPDU to be transmitted to the AP by aggregating MPDUs not soliciting an immediate response. Specifically, when the TID Aggregation Limit field value of the User Info field corresponding to the wireless communication terminal of the trigger frame is 0, the wireless communication terminal may generate an A-MPDU to be transmitted to the AP by aggregating MPDUs not soliciting an immediate response. In a specific embodiment, an MPDU not soliciting an immediate response may include an MPDU including QoS data with the ACK Policy set to No Ack. When the ACK Policy is set to No Ack, the ACK Policy may represent that no ACK is solicited for the corresponding frame. In addition, an MPDU not soliciting an immediate response may include a QoS null frame. At this time, the QoS Null frame may be a QoS Null frame in which ACK Policy is set to No Ack. In addition, an MPDU not soliciting an immediate response may include an Action No Ack frame.

In another specific embodiment, the AP may use the trigger frame to indicate that the wireless communication terminal indicated by the trigger frame is allowed to aggregate MPDUs without the number of TIDs limitation to generate an A-MPDU, and transmit the generated A-MPDU to the AP. Specifically, the AP sets the value of the TID Aggregation Limit field of the User Info field of the trigger frame to 7 to indicate that the wireless communication terminal corresponding to the User Info Field is allowed to aggregate MPDUs without the number of TIDs limitation to generate an A-MPDU, and transmit the generated A-MPDU to the AP.

In the embodiment of FIG. 20, the AP sets the value of the TID Aggregation Limit field of the User Info field corresponding to the third station of the trigger frame to 3 to indicate that the maximum number of TIDs that the A-MPDU to be transmitted to the AP by the third station STA3 is 3. The third station STA3 determines the number of TIDs of the A-MPDU to be transmitted to the AP based on the value of the TID Aggregation Limit field of the User Info field corresponding to the third station of the trigger frame. Specifically, the third station STA3 determines the number of TIDs of the A-MPDU to be transmitted to the AP as 3 based on the value of the TID Aggregation Limit field of the User Info field corresponding to the third station of the trigger frame. The third station STA1 aggregates an MPDU having a TID of 1, an MPDU having a TID of 2, an MPDU having a TID of 3, an Action frame, and a QoS null frame to generate an A-MPDU to be transmitted to the AP. The third station STA3 transmits the generated A-MPDU to the AP. The AP transmits an M-BA frame to a plurality of wireless communication terminals including the third station STA3 based on the A-MPDU received from the third station SAT3. Through this embodiment, the AP adjusts the duration of the M-BA frame. In the embodiment of FIG. 20, the third station STA3 treats MPDUs having no TID, such as a QoS Null frame and an Action frame, as being not included in the number of TIDs indicated by the maximum number of TIDs. However, when there is no block acknowledgment agreement for a specific TID, the response to the MPDU having the corresponding TID may not affect the M-BA frame. Also, as described above, even an MPDU that does not correspond to a specific TID may solicit an immediate response. Therefore, there is a need for a specific embodiment for comparing the number of TIDs and the maximum number of TIDs of the A-MPDU to be transmitted to the AP by the wireless communication terminal. This will be described in detail with reference to FIGS. 21 to 24.

Figure 21:
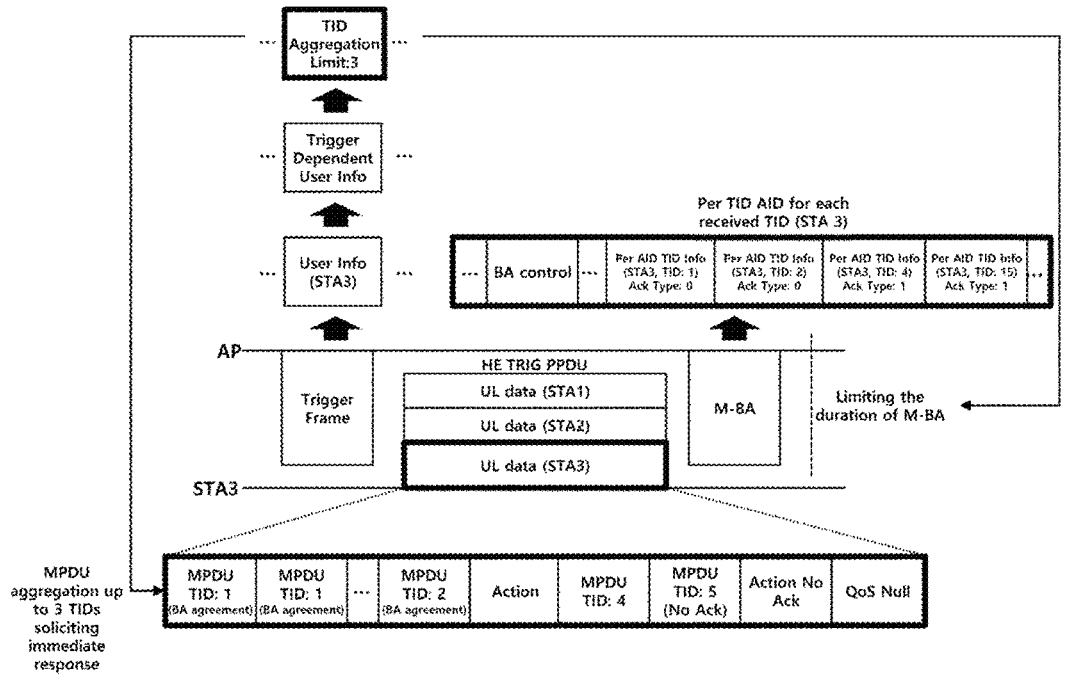
FIG. 21 illustrates an operation of a wireless communication terminal according to another embodiment of the present invention to transmit an A-MPDU based on the maximum number of TIDs information.

FIG. 21 illustrates an operation of a wireless communication terminal according to another embodiment of the present invention to transmit an A-MPDU based on the maximum number of TIDs information.

The AP may use the trigger frame to indicate the maximum number of TIDs with the block acknowledgment agreement that the A-MPDU to be transmitted by the wireless communication terminal is capable of having. The wireless communication terminal may calculate the number of TIDs of the A-MPDU based on the number of TIDs with the block acknowledgment agreement. In the embodiments described above, when the wireless communication terminal compares the number of TIDs of the A-MPDU to be transmitted to the AP and the maximum number of TIDs, the wireless communication terminal may compare the number of TIDs with the block acknowledgment agreement to the maximum number of TIDs. Specifically, when the wireless communication terminal compares the number of TIDs of the A-MPDU to be transmitted to the AP and the maximum number of TIDs, the wireless communication terminal may not calculate the TID with no block acknowledgment agreement as the number of TIDs of the A-MPDU. That is because, since the recipient directly transmits the data corresponding to the TID with no block acknowledgment agreement to the upper layer without storing the data corresponding to the TID in the buffer, data reception corresponding to the TID with no block acknowledgment agreement may not affect the management of the score board. Also, this is because, when the wireless communication terminal calculates the TID with no block acknowledgment agreement as the number of TIDs, the buffer management and the A-MPDU configuration may be restricted. Specifically when the value of the TID Aggregation Limit field is 1 to 6, the wireless communication terminal may generate an A-MPDU having the number of TIDs with block acknowledgment agreement smaller than or equal to the value of the TID Aggregation Limit field, and may transmit the generated A-MPDU to the AP. At this time, the wireless communication terminal may add the MPDU corresponding to the TID with no block acknowledgment agreement to the A-MPDU regardless of the value of the TID Aggregation Limit field. Further, the AP sets the value of the TID Aggregation Limit field of Per User Info of the trigger frame trigger frame to 0 to indicate that the wireless communication terminal corresponding to the Per User Info field is allowed to aggregate MPDUs not soliciting an immediate response regardless of the TID with block acknowledgment agreement to generate an A-MPDU and transmit the generated A-MPDU to the AP. Specifically, when the TID Aggregation Limit field value of the User Info field corresponding to the wireless communication terminal of the trigger frame is 0, the wireless communication terminal may generate an A-MPDU to be transmitted to the AP by aggregating MPDUs not soliciting an immediate response.

In the embodiment of FIG. 21, the AP sets the value of the TID Aggregation Limit field of the User Info field corresponding to the third station of the trigger frame to 3 to indicate that the maximum number of TIDs with block acknowledgment agreement that the A-MPDU to be transmitted to the AP by the third station STA3 is 3. The third station STA3 determines the number of TIDs with block acknowledgment agreement of the A-MPDU to be transmitted to the AP based on the value of the TID Aggregation Limit field of the User Info field corresponding to the third station of the trigger frame. The third station STA3 determines that the A-MPDU to be transmitted to the AP has three TIDs with block acknowledgment agreement based on the value of the TID Aggregation Limit field of the User Info field corresponding to the third station of the trigger frame. There is a block acknowledgment agreement for TID 1, 2, and 4, and there is no block acknowledgment agreement for TID 5. Accordingly, the third station STA3 aggregates an MPDU having a TID of 1, an MPDU having a TID of 2, an MPDU having a TID of 3, an MPDU having a TID of 5, an action No Ack frame, and a QoS null frame to generate an A-MPDU to be transmitted to the AP. The third station STA3 transmits the generated A-MPDU to the AP. The AP transmits an M-BA frame to a plurality of wireless communication terminals including the third station STA3 based on the A-MPDU received from the third station SAT3. Through this embodiment, the AP adjusts the duration of the M-BA frame.

Data corresponding to a TID with no block acknowledgment agreement may also solicit an ACK frame transmission. At this time, the recipient may transmit the M-BA frame including the Per AID TID field that does not include the BA bitmap in response to the MPDU corresponding to the TID with no block acknowledgment agreement. Therefore, even the MPDU corresponding to the TID with no block acknowledgment agreement may affect the duration of the M-BA frame. Thus, the maximum number of TIDs that an A-MPDU may have may be calculated based on the number of TIDs soliciting an immediate response and the number of frames without a TID soliciting an immediate response. This will be described in more detail with reference to FIG. 10.

Figure 22:
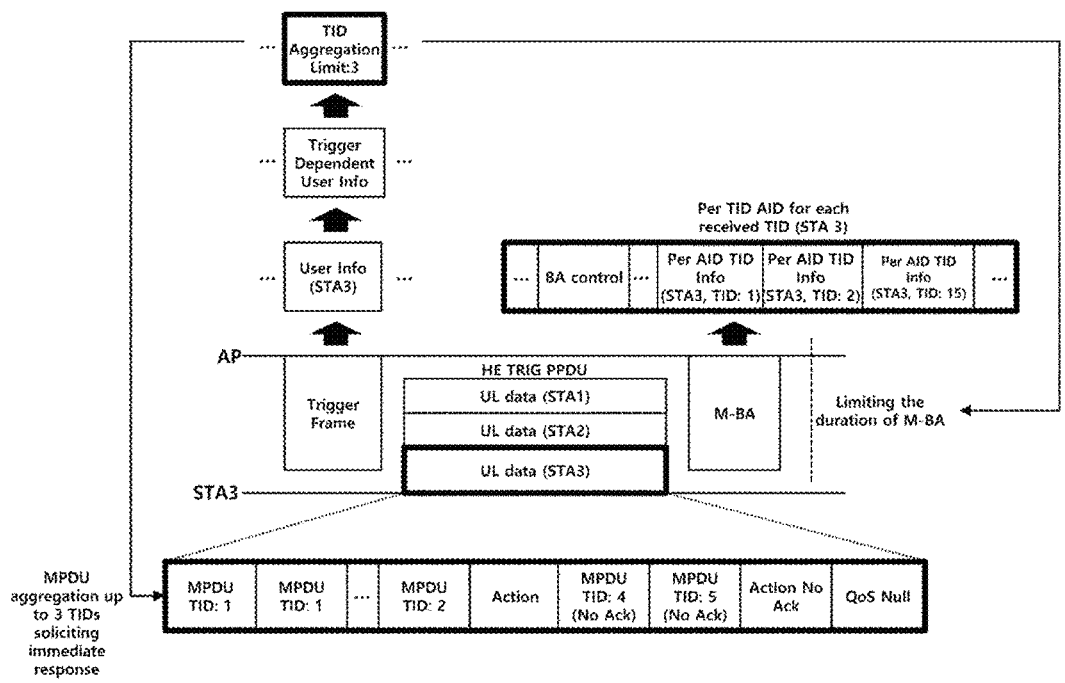
FIG. 22 illustrates an operation of a wireless communication terminal according to another embodiment of the present invention to transmit an A-MPDU based on the maximum number of TIDs information.

FIG. 22 illustrates an operation of a wireless communication terminal according to another embodiment of the present invention to transmit an A-MPDU based on the maximum number of TIDs information.

The AP may use the trigger frame to limit the number of MPDUs soliciting an immediate response that an A-MPDU to be transmitted by a wireless communication terminal may have. The AP may use the trigger frame to limit the number of MPDUs soliciting an immediate response that an A-MPDU to be transmitted by a wireless communication terminal is capable of having. The wireless communication terminal may calculate the number of TIDs of the A-MPDU based on the number of TIDs soliciting an immediate response. In the embodiments described above, when the wireless communication terminal compares the number of TIDs of the A-MPDU to be transmitted to the AP and the maximum number of TIDs, the wireless communication terminal may compare the number of TIDs soliciting an immediate response of the A-MPDU to the maximum number of TIDs. When the wireless communication terminal compares the number of TIDs of the A-MPDU to be transmitted to the AP and the maximum number of TIDs, it is possible to calculate the number of TIDs of the A-MPDU without considering an MPDU not soliciting an immediate response. Therefore, the wireless communication terminal may aggregate MPDUs corresponding to TIDs not soliciting an immediate response regardless of the maximum number of TIDs. Also, the wireless communication terminal may aggregate frames without a TID not soliciting an immediate response regardless of the maximum number of TIDs. Also, the number of TIDs soliciting an immediate response may be the sum of the number of frames having no TID soliciting an immediate response included in the A-MPDU and the number of TIDs soliciting an immediate response included in the A-MPDU. The number of frames without a TID may indicate the type of frame without a TID. Also, an Action frame in which the TID is 15 in the per AID TID field of the M-BA frame may be one of frames without a TID soliciting an immediate response. The MPDU corresponding to the TID not soliciting an immediate response may be the MPDU corresponding to the TID in which ACK policy is set to No Ack. Also, an MPDU corresponding to a TID not soliciting an immediate response may be a QoS null frame. At this time, the ACK policy of the QoS Null frame may be No Ack. Also, a frame without a TID not soliciting an immediate response may be an Action No Ack frame.

As described above, the AP sets the value of the TID Aggregation Limit field of Per User Info of the trigger frame trigger frame to 0 to indicate that the wireless communication terminal corresponding to the Per User Info field is allowed to aggregate MPDUs not soliciting an immediate response regardless of the TID with block acknowledgment agreement to generate an A-MPDU and transmit the generated A-MPDU to the AP. Specifically, when the TID Aggregation Limit field value of the User Info field corresponding to the wireless communication terminal of the trigger frame is 0, the wireless communication terminal may generate an A-MPDU to be transmitted to the AP by aggregating MPDUs not soliciting an immediate response.

In the embodiment of FIG. 22, the AP sets the value of the TID Aggregation Limit field of the User Info field corresponding to the third station of the trigger frame to 3 to indicate that the maximum value of the sum of the number of TIDs that the A-MPDU to be transmitted to the AP by the third station STA3 may have and the number of frames without a TID soliciting an immediate response included in the A-MPDU is 3. The third station STA3 determines the number of sums of the number of TIDs soliciting an immediate response of the A-MPDU to be transmitted to the AP and the number of frames without a TID soliciting an immediate response based on the value of the TID Aggregation Limit field of the User Info field corresponding to the third station of the trigger frame. The third station STA3 determines as 3 the sum of the number of TIDs soliciting an immediate response of the A-MPDU to be transmitted to the AP and the number of frames without a TID soliciting an immediate response based on the value of the TID Aggregation Limit field of the User Info field corresponding to the third station of the trigger frame. TIDs 1 and 2 solicit an immediate response, and TIDs 4 and 5 have the ACK policy set to No Ack. Also, the Action frame solicits an immediate response. Accordingly, the third station STA1 aggregates an MPDU having a TID of 1, an MPDU having a TID of 2, an MPDU having a TID of 4, an MPDU having a TID of 5, an Action frame, an action No Ack frame, and a QoS null frame to generate an A-MPDU to be transmitted to the AP. The third station STA3 transmits the generated A-MPDU to the AP. The AP transmits an M-BA frame to a plurality of wireless communication terminals including the third station STA3 based on the A-MPDU received from the third station SATS. Through this embodiment, the AP adjusts the duration of the M-BA frame.

Figure 23:
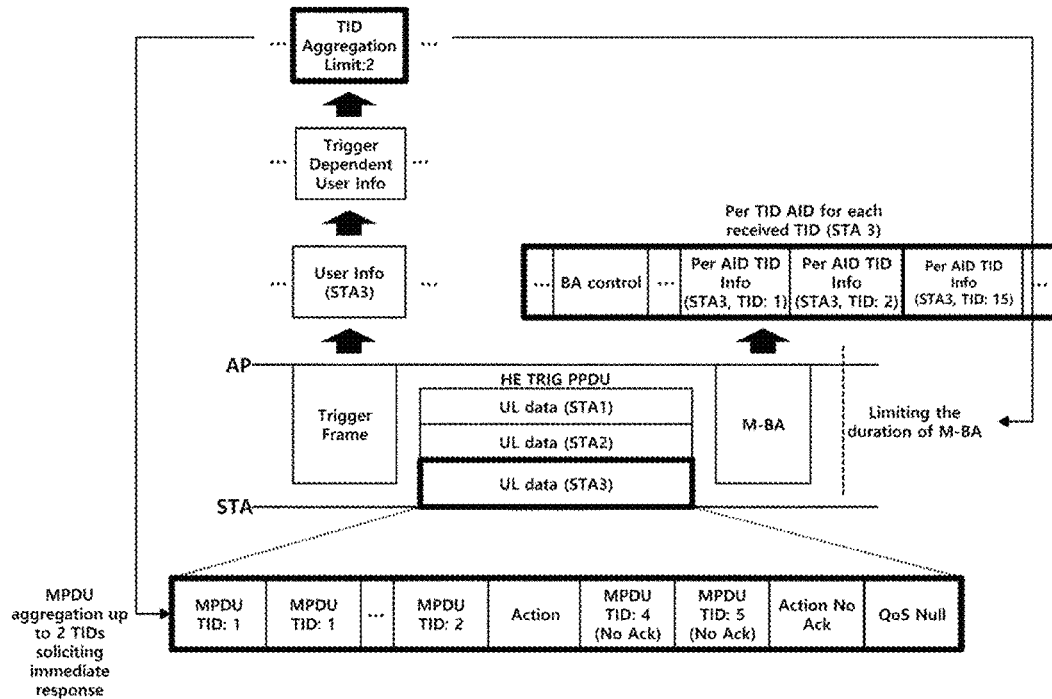
FIG. 23 illustrates an operation of a wireless communication terminal according to another embodiment of the present invention to transmit an A-MPDU based on the maximum number of TIDs information.

FIG. 23 illustrates an operation of a wireless communication terminal according to another embodiment of the present invention to transmit an A-MPDU based on the maximum number of TIDs information.

The Multi-TID A-MPDU may not include a plurality of Action frames. Accordingly, the Multi-TID A-MPDU may include only one Action frame. Also, when the A-MPDU additionally includes an Action frame, the length of the M-BA frame is increased by two octets. Therefore, the change in the M-BA duration due to the addition of the Action frame to the A-MPDU is insignificant. Also, it may be seen that the Action frame is more important than the QoS data frame.

When the wireless communication terminal compares the number of TIDs of the A-MPDU to be transmitted to the AP and the maximum number of TIDs, the wireless communication terminal may not calculate the number of Action frames as the number of TIDs of the A-MPDU. Specifically, when the value of the TID Aggregation Limit field is within a predetermined range, the wireless communication terminal may generate an A-MPDU to be transmitted to the AP by aggregating Action frames regardless of the value of the TID Aggregation Limit field. Specifically, in the embodiments of FIGS. 20 to 22, the wireless communication terminal may not calculate the number of Action frames as the number of TIDs of the A-MPDU.

In the embodiment of FIG. 23, the AP sets the value of the TID Aggregation Limit field of the User Info field corresponding to the third station of the trigger frame to 2 to indicate that the maximum value of the sum of the number of TIDs that the A-MPDU to be transmitted to the AP by the third station STA3 is capable of having and the number of frames without a TID soliciting an immediate response included in the A-MPDU excluding an Action frame is 3. At this time, the Action frame is excluded from the maximum value calculation. The third station STA3 determines the number of sums of the number of TIDs soliciting an immediate response of the A-MPDU to be transmitted to the AP and the number of frames without a TID soliciting an immediate response included in the A-MPDU excluding an Action frame based on the value of the TID Aggregation Limit field of the User Info field corresponding to the third station of the trigger frame. The third station STA3 determines that the A-MPDU to be transmitted to the AP has two TIDs soliciting an immediate response based on the value of the TID Aggregation Limit field of the User Info field corresponding to the third station of the trigger frame. TIDs 1 and 2 solicit an immediate response, and TIDs 4 and 5 have the ACK policy set to No Ack. Also, Action frames are excluded from counting. Accordingly, the third station STA1 aggregates an MPDU having a TID of 1, an MPDU having a TID of 2, an MPDU having a TID of 4, an MPDU having a TID of 5, an Action frame, an action No Ack frame, and a QoS null frame to generate an A-MPDU to be transmitted to the AP. The third station STA3 transmits the generated A-MPDU to the AP. The AP transmits an M-BA frame to a plurality of wireless communication terminals including the third station STA3 based on the A-MPDU received from the third station SATS. Through this embodiment, the AP adjusts the duration of the M-BA frame.

The AP may use the trigger information to instruct the wireless communication terminal transmitting the response to the trigger information to perform channel sensing before transmitting the response. Specifically, the AP may set the CS Required field value of the trigger information to instruct the wireless communication terminal transmitting the response to the trigger information to perform channel sensing before transmitting the response. The CS Required field indicates whether channel sensing is required when the wireless communication terminal transmits a response to the trigger information. At this time, when the value of the CS Required field is 1, the CS Required field may indicate that channel sensing is required. In addition, when transmitting the response to the trigger information, the wireless communication terminal receiving the trigger information may determine whether to perform channel sensing based on the CS Required field of the trigger information. Specifically, when the value of the CS Required field of the trigger information is 1, the wireless communication terminal receiving the trigger information may perform channel sensing when transmitting a response to the trigger information. At this time, the channel sensing may indicate whether the channel to transmit the response to the trigger information is idle or not. Also, channel sensing may indicate CCA operation.

Figure 24:
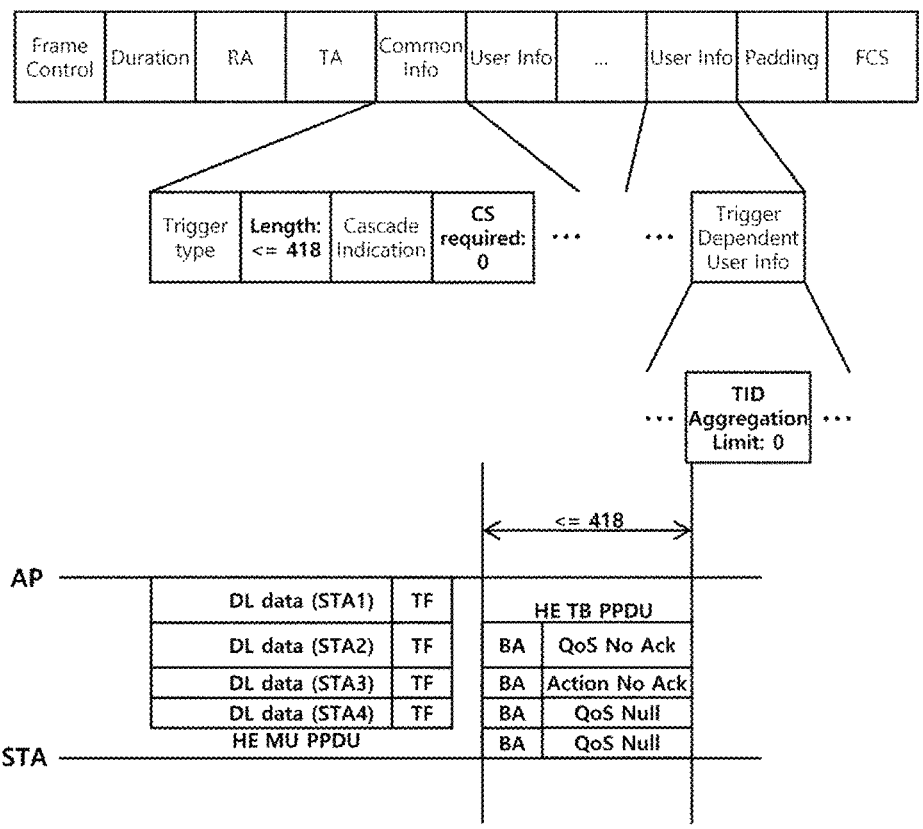
FIG. 24 illustrates an operation of a wireless communication terminal according to an embodiment of the present invention to set the maximum number of TIDs information of a trigger frame.

FIG. 24 illustrates an operation of a wireless communication terminal according to an embodiment of the present invention to set the maximum number of TIDs information of a trigger frame.

When the AP triggers an immediate response to the data transmission using the trigger information, the AP may use the trigger information to indicate that no channel sensing is required when the wireless communication terminal transmits a response to the trigger information. Specifically, when the AP triggers an immediate response to the data transmission using the trigger information and the value of the length field of the common info field of the trigger information is less than or equal to the predetermined value, the AP may use the trigger information to indicate that no channel sensing is required when the wireless communication terminal transmits a response to the trigger information. At this time, the length field indicates information on the length of the trigger-based PPDU. Specifically, the length field may indicate information on the length of the trigger-based PPDU. In addition, the predetermined value may be 418 bytes. Through this, the AP may prevent the wireless communication terminal transmitting the response to the trigger information from not transmitting an immediate response due to the channel sensing. At this time, there is an operational problem that the wireless communication terminal transmits a response to the trigger information and data together. This is because, when a wireless communication terminal operating as an EDCA transmits data, the wireless communication terminal may be required to transmit data after performing channel sensing. Further, this is because, when a wireless communication terminal transmitting a response to the trigger information transmits an MPDU soliciting an immediate response, an additional transmission sequence is required.

In the case where channel sensing is not required when the wireless communication terminal indicated by the trigger frame transmits a response to the trigger information, the terminal may generate an A-MPDU by aggregating MPDUs not soliciting an immediate response and transmit the generated A-MPDU. Specifically, in the case where channel sensing is not required when the wireless communication terminal indicated by the trigger frame transmits a response to the trigger information, the AP may set the value of the TID Aggregation Limit field of the User Info field of the trigger frame to 0 to indicate that the wireless communication terminal indicated by the User Info field is not allowed to aggregate the MPDUs soliciting an immediate response to generate an A-MPDU. Specifically, when the AP triggers an immediate response to the data transmission using the trigger information and the value of the length field of the common info field of the trigger information is less than or equal to the predetermined value, it may indicate that the wireless communication terminal indicated by the trigger frame is not allowed to aggregate the MPDUs soliciting an immediate response to generate an A-MPDU and transmit the generated A-MPDU. In these embodiments, the wireless communication terminal may aggregate MPDUs not soliciting an immediate response to generate an A-MPDU and transmit the generated A-MPDU to the AP.

In the embodiment of FIG. 24, the AP transmits HE MU PPDU to a plurality of stations. At this time, the HE MU PPDU includes a trigger frame soliciting an immediate response to the data MPDU included in the HE MU PPDU. Also, the value of the length field of the Common Info field of the trigger frame is 418. In addition, the CS Required bit of the trigger frame is set to 0. Therefore, the AP sets the value of the TID Aggregation Limit field of the User Info field of the trigger frame to 0. The wireless communication terminal receiving the trigger frame in which the CS Required bit is set to 0 transmits a response to the data MPDU included in the HE MU PPDU and an A-MPDU including the MPDU not soliciting an immediate response together. At this time, the value of the length field of the trigger frame triggering the trigger-based PPDU (HE TB PPDU) including the A-MPDU is less than or equal to 418. Therefore, the first station transmits the A-MPDU including the MPDU including the BA frame and the data in which the ACK Policy is No Ack. The second station transmits an A-MPDU including a BA frame and an action No Ack frame. The third station and the fourth station transmit an A-MPDU including a BA frame and a QoS null frame.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:
1. A wireless communication terminal, the terminal comprising:
 a processor; and
 a communication unit,
 wherein the processor is configured to:
 transmit, through the communication unit, an aggregate MPDU (A-MPDU) consisting of one or more MAC protocol data units (MPDUs),
 wherein the A-MPDU includes at least one MPDU delimiter information and one or more traffic ID(TID) related to the one or more MPDUs,
 wherein each of the at least one MPDU delimiter information include an end of frame (EOF) field and a length field, and
 receive, through the communication unit, a response frame of a specific format in response to the A-MPDU,
 wherein the specific format of the response frame is determined as one of an Ack frame, a compressed BlockAck frame, and a multi-STA BlockAck frame based on a number of at least one TID for successfully received MPDUs among the one or more TIDs and a combination of the EOF field and the length field, and
 wherein the at least one TID solicits an immediate response to the successfully received MPDUs.

2. The wireless communication terminal of claim 1,
wherein the specific format is determined by further considering whether the first MPDU delimiter information in which a value of the EOF field is 1 and a value of the length field is non-zero or the second MPDU delimiter information in which a value of the EOF field is 0 and a value of the length field is non-zero is included.

3. The wireless communication terminal of claim 1,
wherein the specific format of the response frame is determined as a format for the Ack frame when the one or more MPDUs include only one MPDU soliciting an immediate response, and the only one MPDU soliciting the immediate response follows the MPDU delimiter information with a value of the EOF field equal to 1 and a value of the length field is non-zero.

4. The wireless communication terminal of claim 1,
wherein the specific format of the response frame is determined as a format for the compressed BlockAck frame when the at least one TID is the same, and the at least one TID soliciting the immediate response follows the MPDU delimiter information with a value of the EOF field equal to 0.

5. The wireless communication terminal of claim 1,
wherein the specific format of the response frame is determined as a format for the multi-STA BlockAck frame when the one or more MPDUs include at least one MPDU of the at least one TID.

6. The wireless communication terminal of claim 1,
wherein the response frame is carried in a high efficiency single-user PHY protocol data unit (HE SU PPDU) when an MPDU in which an acknowledgment policy is set to HE TB PPDU (HTP) Ack is not present in the A-MPDU.

7. The wireless communication terminal of claim 1,
wherein the response frame is carried in a high efficiency trigger-based PHY protocol data unit (HE TB PPDU) when the A-MPDU contains a trigger frame or the A-MPDU contains a QoS data frame or a QoS null frame with an uplink multi-user response scheduling (UMRS) control field.

8. The wireless communication terminal of claim 7,
wherein an MPDU soliciting the immediate response and contained in the A-MPDU includes at least one of a QoS data frame in which an acknowledgment policy is set to HTP Ack and a QoS Null frame in which an acknowledgment policy is set to HTP Ack.

9. A wireless communication method of a wireless communication terminal, the method comprising:
transmitting through the communication unit, an aggregate MPDU(A-MPDU) consisting of one or more MAC protocol data units (MPDUs),
wherein the A-MPDU includes at least one MPDU delimiter information and one or more traffic ID(TID) related to the one or more MPDUs, and
wherein each of the at least one MPDU delimiter information include an end of frame (EOF) field and a length field; and
receiving, through the communication unit, a response frame of a specific format in response to the A-MPDU,
wherein the specific format of the response frame is determined as one of an Ack frame, a compressed BlockAck frame, and a multi-STA BlockAck frame based on a number of at least one TID for successfully received MPDUs among the one or more TIDs and a combination of the EOF field and the length field, and
wherein the at least one TID solicits an immediate response to the successfully received MPDUs.

10. The wireless communication terminal of claim 9,
wherein the specific format is determined by further considering whether the first MPDU delimiter information in which a value of the EOF field is 1 and a value of the length field is non-zero or the second MPDU delimiter information in which a value of the EOF field is 0 and a value of the length field is non-zero is included.

11. The wireless communication terminal of claim 9,
wherein the specific format of the response frame is determined as a format for the Ack frame when the one or more MPDUs include only one MPDU soliciting an immediate response, and the only one MPDU soliciting the immediate response follows the MPDU delimiter information with a value of the EOF field equal to 1 and a value of the length field is non-zero.

12. The wireless communication terminal of claim 9,
wherein the specific format of the response frame is determined as a format for the compressed BlockAck frame when the at least one TID is the same, and the at least one TID soliciting the immediate response follows the MPDU delimiter information with a value of the EOF field equal to 0.

13. The wireless communication terminal of claim 9,
wherein the specific format of the response frame is determined as a format for the multi-STA BlockAck frame when the one or more MPDUs include at least one MPDU of the at least one TID.

14. The wireless communication terminal of claim 9,
wherein the response frame is carried in a high efficiency single-user PHY protocol data unit (HE SU PPDU) when an MPDU in which an acknowledgment policy is set to HE TB PPDU (HTP) Ack is not present in the A-MPDU.

15. The wireless communication terminal of claim 9,
wherein the response frame is carried in a high efficiency trigger-based PHY protocol data unit (HE TB PPDU) when the A-MPDU contains a trigger frame or the A-MPDU contains a QoS data frame or a QoS null frame with an uplink multi-user response scheduling (UMRS) control field.

16. The wireless communication terminal of claim 15,
wherein an MPDU soliciting the immediate response and contained in the A-MPDU includes at least one of a QoS data frame in which an acknowledgment policy is set to HTP Ack and a QoS Null frame in which an acknowledgment policy is set to HTP Ack.

* * * * *